United States Patent [19]

Hwang

[11] Patent Number: 5,742,151
[45] Date of Patent: Apr. 21, 1998

[54] INPUT CURRENT SHAPING TECHNIQUE AND LOW PIN COUNT FOR PFC-PWM BOOST CONVERTER

[75] Inventor: Jeffrey Hwang, Saratoga, Calif.

[73] Assignee: Micro Linear Corporation, San Jose, Calif.

[21] Appl. No.: 670,181

[22] Filed: Jun. 20, 1996

[51] Int. Cl.$^6$ .............................. G05F 1/70; G05F 1/613
[52] U.S. Cl. .................. 323/222; 323/207; 363/89
[58] Field of Search ....................... 323/222, 223, 323/207, 226, 273, 274, 282, 284; 363/20, 21, 89, 79, 80, 97, 101, 124, 131

[56] References Cited

U.S. PATENT DOCUMENTS

| | | | |
|---|---|---|---|
| 3,294,981 | 12/1966 | Bose | 307/88.5 |
| 3,603,809 | 9/1971 | Uchiyama | 307/228 |
| 3,660,753 | 5/1972 | Judd et al. | 323/22 T |
| 3,883,756 | 5/1975 | Dragon | 307/265 |
| 4,311,954 | 1/1982 | Capel | 323/222 |
| 4,392,103 | 7/1983 | O'Sullivan et al. | 323/222 |
| 4,407,588 | 10/1983 | Arichi et al. | 368/118 |
| 4,437,146 | 3/1984 | Carpenter | 363/21 |
| 4,456,872 | 6/1984 | Froeschle | 323/286 |
| 4,529,927 | 7/1985 | O'Sullivan et al. | 323/222 |
| 4,651,231 | 3/1987 | Douglas, Jr. | 358/342 |
| 4,672,303 | 6/1987 | Newton | 323/285 |
| 4,672,518 | 6/1987 | Murdock | 363/21 |
| 4,677,366 | 6/1987 | Wilkinson et al. | 323/222 |
| 4,691,159 | 9/1987 | Ahrens et al. | 323/222 |
| 4,731,574 | 3/1988 | Melbert | 323/275 |
| 4,736,151 | 4/1988 | Dishner | 323/224 |
| 4,761,725 | 8/1988 | Henze | 363/46 |

(List continued on next page.)

FOREIGN PATENT DOCUMENTS 60-22490 2/1985 Japan .

OTHER PUBLICATIONS

"Nonlinear–Carrier Control for High Power Factor Boost Rectifiers Based on Flyback, Cuk or Sepic Converters", Applied Power Electronics Conf., pp. 814–820, 1996.

Nonlinear–Carrier Control for High Power Factor Boost Rectifiers, D. Maksimovic, Y. Jang, R. Erikson, Applied Power Electronics Conf., pp. 635–641, 1995.

"ML4863 High Efficiency Flyback Controller", Micro Linear Corporation, Feb. 1995 pp. 1–7.

"ML4863EVAL User's Guide High Efficiency Flyback Controller", Micro Linear Corporation, Feb. 1995 pp. 1–5.

"Off–Line and One–Cell IC Converters Up Efficiency", Frank Goodenough, Electronic Design, pp. 55–56, 58, 60, 62–64, Jun. 27, 1994.

(List continued on next page.)

*Primary Examiner*—Adolf Berhane
*Attorney, Agent, or Firm*—Haverstock & Associates

[57] ABSTRACT

An integrated circuit controller for power factor correction circuit that provides unity power factor by sensing only a current in the power factor correction circuit and a dc supply voltage. The power factor correction circuit is coupled to a circuit for generating the dc supply voltage. Thus, the dc supply voltage is representative of the regulated output voltage of the power factor correction circuit. The dc supply voltage is sensed and integrated over each clock cycle and compared to an inverted and amplified version of the sensed current for controlling operation of the power factor correction circuit. By sensing the dc supply voltage, rather than the output voltage of the power factor correction circuit, the integrated circuit requires fewer pins. In a preferred embodiment, the integrated circuit also includes a pulse width modulation controller circuit. Because a single clock signal is utilized for performing both leading edge modulation in the power factor correction circuit and trailing edge modulation in the pulse width modulation circuit, fewer pins are required. Therefore, the integrated circuit controls the power factor correction circuit and the pulse width modulation circuit while being contained within an eight-pin integrated circuit.

22 Claims, 14 Drawing Sheets

U.S. PATENT DOCUMENTS

| | | | |
|---|---|---|---|
| 4,841,220 | 6/1989 | Tabisz et al. | 323/282 |
| 4,845,420 | 7/1989 | Oshizawa et al. | 323/222 |
| 4,920,309 | 4/1990 | Szepesi | 323/269 |
| 4,929,882 | 5/1990 | Szepesi | 323/222 |
| 4,940,929 | 7/1990 | Williams | 323/222 |
| 4,941,080 | 7/1990 | Sieborger | 363/127 |
| 4,947,309 | 8/1990 | Jonsson | 363/17 |
| 4,975,823 | 12/1990 | Rilly et al. | 363/56 |
| 5,028,861 | 7/1991 | Pace et al. | 323/222 |
| 5,034,873 | 7/1991 | Feldtkeller | 363/21 |
| 5,138,249 | 8/1992 | Capel | 323/283 |
| 5,146,399 | 9/1992 | Gucyski | 363/89 |
| 5,278,490 | 1/1994 | Smedley | 323/284 |
| 5,359,281 | 10/1994 | Barrow et al. | 323/284 |
| 5,412,308 | 5/1995 | Brown | 323/267 |
| 5,414,341 | 5/1995 | Brown | 323/268 |
| 5,434,767 | 7/1995 | Bartarseh et al. | 363/16 |
| 5,440,473 | 8/1995 | Ishii et al. | 363/21 |
| 5,450,000 | 9/1995 | Olsen | 323/222 |
| 5,457,621 | 10/1995 | Munday et al. | 363/56 |
| 5,457,622 | 10/1995 | Arakawa | 363/59 |
| 5,461,302 | 10/1995 | Garcia et al. | 323/222 |
| 5,479,089 | 12/1995 | Lee | 323/283 |
| 5,481,178 | 1/1996 | Wilcox et al. | 323/287 |
| 5,485,361 | 1/1996 | Sokal | 363/21 |
| 5,491,445 | 2/1996 | Moller et al. | 327/540 |
| 5,502,370 | 3/1996 | Hall et al. | 323/284 |
| 5,532,577 | 7/1996 | Doluca | 323/282 |
| 5,552,695 | 9/1996 | Schwartz | 323/271 |
| 5,565,761 | 10/1996 | Hwang | 323/222 |
| 5,568,041 | 10/1996 | Hesterman | 323/207 |
| 5,592,071 | 1/1997 | Brown | 323/282 |
| 5,592,128 | 1/1997 | Hwang | 331/61 |
| 5,610,502 | 3/1997 | Tallant, II et al. | 323/222 |
| 5,617,306 | 4/1997 | Lai et al. | 363/17 |
| 5,627,460 | 5/1997 | Bazinet et al. | 323/288 |

OTHER PUBLICATIONS

"Designing with hysteretic current–mode control", Gedaly Levin and Kieran O'Malley, Cherry Semi–Conductor Corp., EDN, pp. 95–96, 98, 100–102, Apr. 28, 1994.

"Analysis of the Flyback Converter Operating in Current––Mode Pulse–Frequency Modulation", Urs Mader and Kit Sum, High Frequency Power Conversion, Apr. 17, 1994.

"Step–Up/Step Down Converters Power Small Portable Systems", Bruce D. Moore, EDN, pp. 79–84, Feb. 3, 1994.

"ML4861 Low Voltage Boost Regulator", Micro Linear Corporation, Jun. 1993 5 pages.

"ML4821 Power Factor Controller", Micro Linear Corporation, Jan. 1992 pp. 119–127.

"Application Note 16", Theory and Application of the ML4821 Average Current Mode PFC Controller, Micro Linear Corporation, Jan. 1992 pp. 102–119.

"ML 4824 Power Factor Correction and PWM Controller Combo," Micro Linear Corporation, May 1997. pp. 1–16.

"11. Variable Frequency Converters," K. Kit Sum, pp. 96–97, 134–135, 1993.

"3.3V/5V/Adjustable Output, Step–Up, DC—DC Converters," Maxim Integrated Products, pp. 1–8, Jun. 1993.

"ML4821EVAL Average Current PFC Controller Evaluation Kit," Micro Linear Corporation, pp. 6–127, Jul. 1992.

"ML4821 Power Factor Controller," Micro Linear Corporation, pp. 1–12, May 1997.

"Small–Signal High–Frequency Analysis of the Free–Running Current–Mode–Controlled Converter," Richard Redl, pp. 897–906, IEEE, 1991.

"Low–Voltage–Input, 3V/3.3V/5V/Adjustable–Output, Step–Up DC—DC Converters," Maxim Integrated Products, pp. 4–189 to 4–191 (no date).

"LT1073 Micropower DC—DC Converter Adjustable and Fixed 5V, 12V" Linear Technology, pp. 4–174 to 4–189, 4–192, (no date).

"Application Note 30," Linear Technology, p. AN30–42, (no date).

"System–Engineered Portable Power Supplies Marry Improved Efficiency And Lower Cost," Bruce D. Moore, Maxim Integrated Products (no date).

"ML4823 High Frequency Power Supply Controller," Micro Linear Corporation, pp. 1–8, Dec. 1994 (Preliminary).

"CD54/74HC 4046A, CD54/74HCT 4046A Technical Data," File No. 1854, RCA, (no date).

"ML4863 High Efficiency Battery Pack Converter," Micro Linear Corporation, p.1, Jun. 1994 (Preliminary).

"ML4880 Portable PC/PCMCIA Power Controller," Micro Linear Corporation, p.1, Oct. 1995 (Preliminary).

INPUT CURRENT SHAPING TECHNIQUE AND LOW PIN COUNT FOR PFC-PWM BOOST CONVERTER

FIELD OF THE INVENTION

This invention relates to the field of switching mode power converters. More particularly, the present invention relates to the field of switching mode power converters contained in an integrated circuit having a low pin count and that include both a switching mode power factor correction circuit utilizing input current shaping and a pulse width modulation circuit.

BACKGROUND OF THE INVENTION

In a typical switching mode power converter, the output voltage is controlled by an electronic circuit that measures a level of the output voltage, compares that measured level to a predetermined desired level, and develops a response to that comparison elsewhere in the circuit in order to more accurately achieve the desired output voltage. A prior art switching mode power converter that uses a trailing edge modulation control scheme is illustrated in FIG. 1. The input voltage VIN is coupled to a first terminal of an inductor L1. A second terminal of the inductor L1 is coupled to a first terminal of a switch SW1 and to an anode of a diode D1. A capacitor C1 is coupled between a cathode of the diode D1 and a second terminal of the switch SW1. A load RL is coupled across the capacitor C1. A potentiometer PT1 is coupled across the load RL and provides a negative input to an error amplifier 10. A reference voltage REF is coupled to a positive input to the error amplifier 10. An output VEAO of the error amplifier 10 is coupled to a positive input to a pulse width modulating comparator 14. A negative input to the comparator 14 is coupled to receive a ramp output of an oscillator 12. An output of the comparator 14 is coupled as an inverted reset input $\bar{R}$ of a flip-flop 16. An input D of the flip-flop 16 is coupled to an inverted output $\bar{Q}$ of the flip-flop 16. A clock input CLK of the flip-flop 16 is coupled to a clock output of the oscillator 12. An output Q of the flip-flop 16 is coupled to control the state of the switch SW1.

The output voltage VOUT supplied to the load RL is formed by integrating the inductor current I1 in the capacitor C1. Pulse width modulation (PWM) is used to maintain a constant output voltage VOUT when the input voltage VIN varies over time. By modulating the width of voltage pulses that control the switch SW1, the output voltage VOUT can be maintained at a constant level. Energy from the input source VIN is stored in the inductor L1 when the switch SW1 is closed. When the switch SW1 is open, energy from the inductor L1 is transferred to the capacitor C1 and to the load RL. A predetermined fraction of the output voltage VOUT is formed by the potentiometer PT1. This voltage VEA is input into the negative terminal of the error amplifier 10 for comparison to the reference voltage REF. The comparison determines how close the actual output voltage VOUT is to the desired output voltage and is used to modulate the width of the pulses that control the switch SW1.

FIG. 1 illustrates a trailing edge pulse width modulation scheme for controlling the switch SW1. In trailing edge modulation, the switch SW1 turns on (closes) on the trailing edge of the clock signal. The leading edge of the clock signal may also be utilized to implement leading edge modulation. For a leading edge modulation control scheme, the inputs to the error amplifier 10 are be reversed: the voltage VEA from the potentiometer PT1 is coupled to the positive terminal of the voltage error amplifier 10 and the reference voltage REF is coupled to the negative terminal of the voltage error amplifier 10.

FIGS. 2, 3 and 4 show voltage waveforms with respect to time of various voltage levels within the switch control circuitry 31 illustrated in FIG. 1. The time axis in each of FIGS. 2, 3 and 4 has been drawn to correspond to the others. FIG. 2 illustrates the voltage levels with respect to time of the error amplifier output VEAO and the modulating ramp output of the oscillator 12. FIG. 3 illustrates the voltage level with respect to time of the control voltage VSW1 for the switch SW1. The switch SW1 is "on" or closed when the control voltage VSW1 is at a high voltage level. The switch SW1 is "off" or open when the control voltage is at a low voltage level. FIG. 4 illustrates the clock impulses with respect to time of the clock output of the oscillator 12.

The switch SW1 turns on after the trailing edge of the system clock. Once the switch SW1 is on, the inductor current IL will ramp up and the modulating comparator 14 then compares the error amplifier output voltage VEAO and the modulating ramp RAMP. When the signal RAMP is higher than the signal VEAO, the output of the comparator 14 will fall to a logical low voltage level. Due to the inverter at its input, the input R of the flip-flop 16 will then rise to a logical high voltage level thereby resetting the output Q of the flip-flop 16 to a logical low voltage level and mining off the switch SW1. The duty cycle is determined as a ratio of the on time of the switch to its off time.

While the above-described circuit regulates the output voltage, it does not ensure that the input current follows the input voltage in time and amplitude proportionally. When a power converter such as in shown in FIG. 1 is coupled to receive a rectified line voltage, it can cause problems in a power distribution system, such as reducing the capacity of the distribution system, increasing harmonics and overheating substation transformers. Therefore, it is desirable that a power converter ensure that the input current follow the line voltage such that the power converter is substantially a resistive load to the power line. A power factor correction circuit ensures that the input current follows the line voltage in time and amplitude proportionally (i.e. the input voltage and current are maintained in phase relative to each other).

A circuit diagram of a boost rectifier circuit including pulse width modulation and power factor correction is illustrated in FIG. 5. Elements that are identical to those of FIG. 1 use the same reference numerals. A line voltage is coupled to the input terminals of a full wave bridge rectifier 18. A first output terminal of the full wave bridge rectifier 18 is coupled to a first terminal of an inductor L1 and to a first input terminal of a multiplier 20. A second terminal of the inductor L1 is coupled to a drain of an NMOS transistor SW1 and to an anode of a diode SW2. A source of the NMOS transistor SW1 is coupled to the ground node.

A cathode of the diode SW2 is coupled to a first terminal of a capacitor C1 and to an output node Vout. A second terminal of the capacitor C1 is coupled to the ground node. A first terminal of a resistor R1 is coupled to the output node Vout. A second terminal of the resistor R1 is coupled to a negative input of an output voltage error amplifier 10 and to a first terminal of a resistor R2. A second terminal of the resistor R2 is to the ground node. A positive input of the amplifier 10 is coupled to a reference voltage Vref. An output of the amplifier 10 is coupled to a second input of the multiplier 20.

An output of the multiplier 20 is coupled to a positive input terminal of a current error amplifier 22 and to a first terminal of a resistor Ra. A second terminal of the resistor Ra is coupled to a second output terminal of the full wave bridge rectifier 18 and to a first terminal of a sense resistor Rs. A second terminal of the sense resistor Rs is coupled to a first terminal of a resistor Rb and to the ground node. A second terminal of the resistor Rb is coupled to a negative input terminal of the amplifier 22. An output of the current error amplifier 22 is coupled to a negative input terminal of a modulating comparator 14. A ramp output of the oscillator 12 is coupled to a positive input terminal of the modulating comparator 14. An output of the modulating comparator 14 is coupled as an input R of a flip-flop 16. A clock output of the oscillator 12 is coupled as an input S of the flip-flop 16. An output Q of the flip-flop 16 is coupled to a gate of the NMOS transistor SW1.

A signal from the full wave bridge rectifier 18 is applied to one of the inputs of the multiplier 20. The other input to the multiplier 20 is the output of the voltage error amplifier 10. The multiplier 20 is usually of a current input type which enables the multiplier 20 to have greater ground noise immunity. When there is a current at its input, the terminal voltage of the multiplier 20 is a diode drop between 0.7V and 1V.

The output of the multiplier 20 is a current which is the product of the reference current, the output of the voltage error amplifier 10 and a gain adjustor factor. This output current is applied to the resistor Ra. The voltage across the resistor Ra subtracts from the sensed voltage across the sense resistor Rs and is applied to the current error amplifier 22. Under closed loop control, the current error amplifier 22 will try to keep this voltage differential near the zero volt level. This forces the voltage produced by the return current flowing through the sense resistor Rs to be equal to the voltage across the resistor Ra.

The amplified current error signal output from the current error amplifier 22 is then applied to the negative input to the modulating comparator 14. The other input to the modulating comparator 14 is coupled to receive the ramp signal output from the oscillator 12. Pulse width modulation is obtained when the amplified error signal that sets up the trip point modulates up and down.

Thus, a current control loop modulates the duty cycle of the switch SW1 in order to force the input current to follow the waveform of the full wave rectified sinewave input voltage. The current control loop and the power delivery circuitry must have at least enough bandwidth to follow this waveform.

In an article entitled "Nonlinear-Carrier Control For High Power Factor Boost Rectifiers", Dragan Maksimovic, Yungtaek Jang and Robert Erickson introduced a nonlinearcarrier controller for high power factor boost rectifiers. Dragan Maksimovic, Yungtaek Jang and Robert Erickson, "Nonlinear-Carrier Control For High Power Factor Boost Rectifiers," 1995 IEEE APEC Conference, pages 635–641. The power factor controller proposed by Maksimovic et al. integrates the current through the switch and compares it with a parabolic carrier waveform in order to control the duty cycle of the switch. This eliminates the input voltage sensing, the current error amplifier and the multiplier in the voltage feedback loop, which were all necessary in the power factor controller illustrated in FIG. 5.

A block diagram schematic of a boost rectifier according to the teachings of Maksimovic et al. is illustrated in FIG. 6. The non-linear carrier controller 60 includes an integrator 80 for integrating the switch current Is and a carrier generator 74 for generating the carrier waveform Vc. An anode of a diode 62 is coupled to receive the switch current Is. A cathode of the diode 62 is coupled to a first terminal of a switch 64, to a first terminal of a capacitor 66 and to a positive input to a comparator 68, forming an output of the integrator 80 which provides the integrated signal Vq, representing the current flowing through the switch SW1. A second terminal of the switch 64 is coupled to a second terminal of the capacitor 66 and to ground.

A negative input to an adder circuit 78 is coupled to receive the output voltage Vo, representing the voltage delivered to the load. A positive input to the adder circuit 78 is coupled to receive a reference voltage Vref. A modulating output of the adder circuit 78 is coupled as an input to a voltage-loop error amplifier 76. An output Vm of the voltage-loop error amplifier 76 is coupled as an input to the carrier generator circuit 74. An output of the carrier generator circuit 74 provides the carrier waveform Vc and is coupled to a negative input to the comparator 68. An output of the comparator 68 is coupled to a reset input R of a flip-flop 70. An oscillator 72 provides a clock signal which is coupled to the carrier generator circuit 74 and to a set input S of the flip-flop 70. An inverted output $\overline{Q}$ of the flip-flop 70 is coupled to control the switch 64. An output Q of the flip-flop 70 is coupled as an input to the gate driver circuit 82. Together the output Q of the flip-flop 70 and the gate driver circuit 82 control the operation of the switch SW1.

The integrated signal Vq is generated by the integrator 80 in response to the level of the current Is flowing through the switch SW1. The modulating output Vm of the voltage-loop error amplifier 76, representing the difference between the output voltage Vo and the reference voltage Vref, is input to the carrier generator 74 for generating the carrier waveform Vc. The comparator 68 compares the integrated signal Vq to the carrier waveform Vc. The output of the comparator 68 is at a logical low voltage level when the integrated signal Vq is less than the carrier waveform Vc. The output of the comparator 68 is at a logical high voltage level when the integrated signal Vq is greater than the carrier waveform Vc. The output of the comparator 68 is input to the flip-flop 70 and signals when the switch SW1 should be turned off. The oscillator clock signal generated by the oscillator 72 signals when the switch SW1 should be turned on. In this manner, the duty cycle of the switch SW1 is controlled by the nonlinear carrier controller illustrated in FIG. 6.

Recall that a goal of a power factor controller is to ensure that the input current follows the input voltage. Thus, Maksimovic et al. started with the proposition that the converter appears as a resistive load to the AC input line, having a resistance value equal to an emulated resistance value Re. Therefore, the input current is equal to the input voltage Vin divided by the resistance Re, as demonstrated by the following equation:

$$Iin = \frac{Vin}{Re} = I1 \qquad (1)$$

As also illustrated by equation (1), the input current Iin is equal to the current I1 through the inductor. It is further true that the current I1 is equal to the sum of the current Is through the switch SW1 and the current Id through the diode D2, as illustrated by the following equation:

$$I1 = Is + Id \qquad (2)$$

It can also be assumed that the input power of the rectifier circuit, represented by the input voltage Vin multiplied by the current I1 through the inductor, is equal to the output power of the rectifier circuit, represented by the output voltage Vo multiplied by the current Id through the diode, if there are negligible power losses throughout the circuit. This relationship is illustrated in the following equation:

$$Vin \ I1 = Vo \ Id \quad (3)$$

In each cycle, the current Is through the switch SW1 is represented by the following equation:

$$Is = \frac{1}{Ts} \int_0^{dTs} Is(t) dt \quad (4)$$

If the equations (1) and (3) are combined, the current Is can also be calculated as shown in the following equations:

$$Is = \frac{Vin}{Re} - Id \quad (5)$$

$$Is = \frac{Vin}{Re} - \frac{Vin}{Vo} I1 \quad (6)$$

$$Is = \frac{Vin}{Re} \left( 1 - \frac{Vin}{Vo} \right) \quad (7)$$

$$Is = \frac{Vin}{Re} \left( \frac{Vo - Vin}{Vo} \right) \quad (8)$$

$$Is = \frac{Vo}{Re} D(1-D); \text{If } Vin = Vo(1-D) \quad (9)$$

If the boost converter operates in the continuous conduction mode, then the input voltage Vin is equal to the output voltage Vo multiplied by one minus the duty ratio D of the switch SW1. By then comparing the values derived using the equations (4) and (9), pulse width modulation can be used to control the duty cycle of the switch SW1.

Timing diagrams of relevant signals within the nonlinear carrier controller taught by Maksimovic et al. are illustrated in FIG. 7. The two signals Vq and Vc which are input to the comparator 68 are illustrated in FIG. 7a. The clock signal output by the oscillator 72 is illustrated in FIG. 7b. The pulses illustrated in FIG. 7b represent the trailing edge of the clock signal. The output of the comparator 68 is illustrated in FIG. 7c. The output of the gate driver circuit 82 is illustrated in FIG. 7d. The output of the gate driver circuit 82 represents the duty cycle of the switch SW1.

At the trailing edge of the clock signal, as illustrated in FIG. 7b, the carrier waveform Vc is reset and the output Q of the flip-flop 70 is set, thereby raising the output of the gate driver circuit 82 to a logical high voltage level and closing or mining on the switch SW1. The integrated signal Vq, representing the current flowing through the switch SW1, rises when the switch SW1 is closed. When the value of the signal Vq is greater than the value of the carrier waveform Vc, the output of the comparator 68 will rise to a logical high voltage level, causing the output of the flip-flop 70 to fall to a logical low voltage level. When the output Q of the flip-flop 70 falls to a logical low voltage level, the output of the gate driver circuit 82 is pulled to a logical low voltage level and the switch SW1 is open or turned off. The duty cycle of the switch SW1 is therefore set between the trailing edge of the clock signal and the time when the integrated signal Vq rises above the carrier waveform Vc. The difference between the value of the output voltage Vo and the value of the reference voltage Vref influences the characteristics of the carrier waveform Vc. Accordingly, pulse width modulation is used to vary the duty cycle of the switch SW1 in order to achieve the desired output voltage Vo.

The nonlinear carrier controller taught by Maksimovic et al. provides a simpler implementation for a power factor correction circuit than the circuits of the prior art. However, the technique and circuit taught by Maksimovic et al. is suitable only for boost converters operating in the continuous conduction mode.

A boost converter configured as a leading edge power factor correction circuit are disclosed in co-pending U.S. patent application Ser. No. 08/667,117, filed Jun. 20, 1996, and illustrated in FIG. 8. As illustrated in FIG. 8, a first terminal of an inductor L1 is coupled to a first output terminal of a full wave bridge rectifier for receiving an input voltage Vin. A second terminal of the inductor L1 is coupled to a first terminal of a switch SW1 and to an anode of a diode D1. A cathode of the diode D1 is coupled to a first terminal of a capacitor C1. A second terminal of the capacitor C1 is coupled to a second terminal of the switch SW1, to a first terminal of a sense resistor RSENSE and to the ground node. A load is coupled across the capacitor C1. A potentiometer PT1 is also coupled across the capacitor C1.

A second terminal of the sense resistor RSENSE is coupled to a second output terminal of the rectifier, to an input to an integrator circuit 112 and to a negative input to a comparator 111. A reference voltage having a value of −1 volts is coupled to a positive input to the comparator 111. An output of the comparator 111 is coupled to a set input S of a flip-flop 102. An output VD1 of the integrator circuit 112 is coupled to a first terminal of a reset switch 108 and to a positive input to a comparator 113. A second terminal of the reset switch 108 is coupled to ground.

An output VFB of the potentiometer PT1 is coupled to a negative input to an error amplifier 114 and to a positive input to a comparator 120. A reference voltage having a value of 2.5 volts is coupled to a positive input to the amplifier 114. An output VEAO of the amplifier 114 is coupled to an input to an integrator circuit 116, to a first terminal of a resistor 132 and to a first terminal of a capacitor 128. A second terminal of the resistor 132 is coupled to a first terminal of a capacitor 130. A second terminal of the capacitor 128 is coupled to a second terminal of the capacitor 130 and to the ground node. Together, the resistor 132 and the capacitors 128 and 130 form a 30 Hz compensation network.

A reference voltage having a value of 2.7 volts is coupled to a negative input to the comparator 120. An output of the comparator 120 is coupled to the output of the comparator 111 and to the set input S of the flip-flop 102. An output of the integrator circuit 116 is coupled as an input to a squaring circuit 118 and to a first terminal of a reset switch 117. A second terminal of the reset switch 117 is coupled to the ground node. An output Vc of the squaring circuit 118 is coupled to a negative input to the comparator 113. Together, the integrator circuit 116 and the squaring circuit 118 generate the carrier waveform Vc in response to the level of the output VEAO of the error amplifier 114. An output of the comparator 113 is coupled to a reset input R of a flip-flop 104.

A reference voltage having a value of 7.5 volts is coupled to a positive input to an amplifier 124. An output of the amplifier 124 is coupled to a base of an npn transistor 122. A collector of the transistor 122 is coupled to a positive supply voltage VCC. An emitter of the transistor 122 is coupled to a first terminal of a resistor 134 and to a negative input to the amplifier 124. A second terminal of the resistor 134 is coupled to a first terminal of a capacitor 136 and to an input to an oscillator 126. A second terminal of the capacitor 136 is coupled to ground. Together, the resistor 134 and the capacitor 136 form an RC network which provides a reference signal by which the oscillator 126 generates an oscillator clock reference signal having a period relative to the value of the signal input from the RC network formed by the resistor 134 and the capacitor 136.

An output, providing the clock reference signal Clock, of the oscillator 126 is coupled to a reset input R of the flip-flop 102, to a set input S of the flip-flop 104, to control the reset switches 108, 117 and as a first input to a logical NOR gate 106. An output Q of the flip-flop 102 is coupled as a second input to the logical NOR gate 106. An output Q of the flip-flop 104 is coupled as a third input to the logical NOR gate 106. An output of the logical NOR gate 106 is coupled to control the operation of the switch SW1.

The positive supply voltage VCC is coupled to a cathode of a Zener diode 110. An anode of the diode 110 is coupled to ground. The diode 110 maintains the necessary voltage difference between the positive supply voltage VCC and the ground node.

The nonlinear carrier controlled power factor correction circuit 100 of FIG. 8 is embodied within an eight-pin integrated circuit. Within the integrated circuit, the pin P1 is coupled to the input to the integrator circuit 112. The pin P1 is also configured for coupling to the second terminal of the sense resistor RSENSE. Within the integrated circuit, the pin P7 is coupled to the negative input to the error amplifier 114 and the positive input to the comparator 120. The pin P7 is also configured for coupling to the output of the potentiometer PT1 to receive the feedback signal VFB. Within the integrated circuit, the pin P2 is coupled to the output of the error amplifier 114 and the input to the integrator circuit 116. The pin P2 is also configured for coupling to the 30 Hz compensation network including the resistor 132 and the capacitors 128 and 130. Within the integrated circuit, the pin P3 is coupled to the emitter of the transistor 122 and to the negative input to the amplifier 124. The pin P3 is also configured for coupling to the first terminal of the resistor 134 of the RC network. Within the integrated circuit, the pin P4 is coupled to the input to the oscillator 126. The pin P4 is also configured for coupling to the second terminal of the resistor 134 and to the first terminal of the capacitor 136. Within the integrated circuit, the pin P8 is coupled to the anode of the diode 110. The pin P8 is also configured for coupling to the ground node. Within the integrated circuit, the pin P6 is coupled to the cathode of the diode 110. The pin P6 is also configured for coupling to the positive supply voltage VCC. Within the integrated circuit, the pin P5 is coupled to the output of the logical NOR gate 106. The pin P5 is also configured for coupling to control the switch SW1.

In each cycle, the current flowing through the diode D1 is represented by the following equation:

$$Id = \frac{1}{Ts} \int_{TsD}^{Ts} Id(t)dt \quad (10)$$

The equations (1) and (3) from above are combined and the current Id is calculated as shown in the following equations:

$$Id = \frac{Vin\, Il}{Vo} \quad (11)$$

$$Id = \frac{Vin}{Vo}\left(\frac{Vin}{Re}\right) \quad (12)$$

$$Id = \frac{Vin^2}{Vo\, Re} \quad (13)$$

$$Id = \frac{Vo\,(1-D)^2}{Re} \; ; \text{If } Vin = Vo(1-D) \quad (14)$$

-continued $$Id = \frac{Vo}{Re}\,(1-D)^2 \quad (15)$$

$$Id = \frac{Vo}{Re}\,(D')^2 \quad (16)$$

The period D' represents the portion of each period of the clock cycle when the switch SW1 is open or off (i.e. D'=1−D). By comparing the values derived using the equations (10) and (16), pulse width modulation is used to control the switch SW1. As the expected value of the voltage Vo supplied to the load differs from a reference voltage, the shape and height of the carrier waveform is adjusted, moving the trip point at which time the output of the integrator reaches a value above the value of the carrier waveform and turns the switch SW1 on. Accordingly, the cycle-by-cycle average of the current flowing through the diode is compared to the periodic carrier waveform, forcing the input current in the rectifier circuit to automatically follow the input line voltage.

Using the above relationships, the circuit 100 of FIG. 8, compares the integrated signal VD1 with the periodic carrier waveform Vc to control the duty cycle of the switch SW1 ensuring that the rectifier input current follows the input voltage. When the switch SW1 is open, the current flowing through the sense resistor RSENSE represents the current Id flowing through the diode D1. This signal is integrated by the integrator circuit 112 to form the integrated signal VD1. The carrier waveform Vc is generated by the circuits 114, 116 and 118 in response to a level of the feedback signal VFB from the potentiometer PT1. The slow-varying modulating input VFB, representing the output voltage Vo delivered to the load, is used to control the emulated resistance and the power level in the output voltage regulation loop without the need for a multiplier.

When the switch SW1 is open or off, the integrated signal VD1 is rising. When the value of the signal VD1 rises above the value of the carrier waveform Vc the output of the comparator 113 rises to a logical high voltage level and the switch SW1 is turned on or closed. The switch SW1 is then turned off on the next leading edge of the clock signal generated by the oscillator 126.

Timing diagrams of relevant signals within the power factor correction circuit 100 of FIG. 8 are illustrated in FIG. 9. A timing diagram of one period of the periodic carrier waveform Vc provided as the output of the squaring circuit 118 is illustrated in FIG. 9a. A timing diagram of the integrated signal VD1 generated by the integrator circuit 112 and representing the current through the diode D1 is illustrated in FIG. 9b. A timing diagram illustrating the duty cycle D or time during a period when the switch SW1 is on, is shown in FIG. 9c. A timing diagram illustrating the time period D' or the time during a period when the switch SW1 is off, is shown in FIG. 9d. A timing diagram of the clock reference signal Clock, provided as the output of the oscillator 126, is illustrated in FIG. 9e.

During a period of the clock reference signal Clock, the carrier waveform Vc output from the squaring circuit 118 rises until it is reset at the leading edge of the clock reference signal Clock. At the beginning of the period of the clock reference signal Clock when the switch SW1 is off or open, the output VD1 of the integrator circuit 112, rises linearly. The switch SW1 is turned on or closed when the output VD1 of the integrator circuit 112 rises above the value of the carrier waveform Vc. The switch SW1 is then turned off at the leading edge of the clock reference signal Clock output by the oscillator 126.

Because the current flows from ground through the sense resistor RSENSE, the value of the voltage signal input to the integrator circuit 112 is negative. Therefore, the integrator circuit 112 provides a positive output integrated signal VD1. The reset switch 108 is on or closed during each pulse of the clock reference signal output from the oscillator U9, to reset the integrated signal VD1 to zero to ensure the correct zero initial conditions. The output VD1 of the integrator 112 is, therefore, pulled to a ground level during each clock pulse when the switch 108 is closed.

The voltage signal representing the level of current flowing through the sense resistor RSENSE, which is input to the integrator circuit 112 is also input to the comparator 111. If the value of this voltage signal falls below a level equal to −1 volts, then the output of the comparator 111 will rise to a logical high voltage level. When the output of the comparator 111 rises to a logical high voltage level, the output Q of the flip-flop 102 will rise to a logical high voltage level, causing the output of the logical NOR gate 106 to fall to a logical low voltage level and the switch SW1 to be turned off.

A voltage signal VFB, representing the output of the potentiometer PT1 is input to the error amplifier 114. The error amplifier 114 amplifies a difference between the value of the voltage signal VFB and the reference voltage having a value equal to 2.5 volts to obtain the output VEAO. The output VEAO of the error amplifier will change as the level of the voltage signal VFB varies. The integrator 116 and the squaring circuit 118 transform the modulating input VEAO from the error amplifier U3 into the carrier waveform signal VC.

The voltage signal VFB is also input to the comparator 120 and compared to the reference voltage having a value equal to 2.7 volts. If the value of the voltage VFB rises above a level equal to 2.7 volts, then the output of the comparator 120 will rise to a logical high voltage level. When the output of the comparator 120 rises to a logical high voltage level, the output Q of the flip-flop 102 will rise to a logical high voltage level, causing the output of the logical NOR gate 106 to fall to a logical low voltage level and the switch SW1 to be turned off.

At the leading edge of the clock reference signal Clock, the output of the logical NOR gate 106 falls to a logical low voltage level thereby turning off or opening the switch SW1. The carrier waveform Vc, generated by the integrator 116 and the squaring circuit 118, then increases as illustrated in FIG. 9a. The integrated signal VD1 from the integrator circuit 112 also increases as illustrated in FIG. 9b. When the integrated signal VD1 rises above the carrier waveform Vc, the output of the comparator 113 rises to a logical high voltage level causing the output Q of the flip-flop 104 to fall to a logical low voltage level. Because all of the inputs to the logical NOR gate 106 are at a logical low voltage level, the output of the logical NOR gate 106 will rise to a logical high voltage level thereby turning on (closing) the switch SW1.

The switch SW1 stays on until the leading edge of the next pulse of the clock reference signal Clock. On the leading edge of the next pulse of the clock reference signal Clock, the output Q of the flip-flop 102 is reset to a logical low voltage level, the output Q of the flip-flop 104 is set to a logical high voltage level, the output of the logical NOR gate 106 is pulled to a logical low voltage level, the switch SW1 is turned off (opened) and the switch 108 is turned on (closed). The duty cycle D of the switch SW1 is therefore set between the time the integrated signal VD1 rises above the carrier waveform Vc and the leading edge of the clock reference signal Clock.

The circuit of FIGS. 8 and 9 operates in both the continuous and discontinuous conduction modes. The circuit of FIGS. 8 and 9 requires only the integrator circuit 116 and the squaring circuit 118 to generate the carrier waveform Vc. The nonlinear carrier controlled power factor correction circuit of the circuit of FIGS. 8 and 9 does not require sensing of the input current and voltage. The nonlinear carrier controlled power factor correction circuit of the circuit of FIGS. 8 and 9 also does not require a multiplier within the voltage-control loop.

The above-described power factor correction circuits are switching mode power converters. Like other switching mode converters, they too may cause problems in a power distribution system such as large harmonic currents, excessive neutral current, hot spots in a transformer and voltage distortion. Thus, it is desirable to include a second power converter stage to reduce harmonic currents. Co-pending U.S. patent application Ser. No. 08/300,475, filed Sep. 2, 1994, discloses a synchronous switching cascade connected combination power factor correction circuit and pulse width modulation circuit power converter.

Such a combination circuit including a power factor correction and pulse width modulation circuit is illustrated in FIG. 10. A first power factor correction stage of the power converter uses a leading edge modulation scheme to control the switches SW1 and SW2. A second stage of the power converter utilizes a trailing edge modulation scheme in which the duty cycle of the switches SW3 and SW4 is ideally held constant, but will vary as the voltage across the capacitor 152 varies. Preferably, a single clock signal controls both stages to realize synchronous switching of the two stages, but separate clock signals could be utilized.

The function of the power factor correction first stage is to ensure that the current follows the voltage in time and amplitude proportionately. The duty cycle of the first stage is varied to maintain a constant output voltage across the capacitor 152. Because the converter typically interfaces with an offline AC input source, the capacitor 152 must be able to withstand a high voltage of approximately 380 VDC. The duty cycle of the second stage is ideally held constant at fifty percent, but will vary to maintain a constant output voltage.

Referring to FIG. 10, a rectified input voltage VIN is coupled to a pair of input terminals. A first input terminal is coupled to a first terminal of an inductor L1. A second terminal of the inductor L1 is coupled to a first terminal of a switch SW1 and to a first terminal of a switch SW2. A second terminal of the switch SW1 is coupled to a second input terminal and to a ground node. A second terminal of the switch SW2 is coupled to a first terminal of a capacitor 152 and to a first terminal of a switch SW3. A second terminal of the capacitor 152 is coupled to the ground node.

A second terminal of the switch SW3 is coupled to a first terminal of a switch SW4 and to a first terminal of an inductor 154. A second terminal of the switch SW4 is coupled to the ground node. A second terminal of the inductor 154 is coupled to a first terminal of a capacitor 156 and to an output node VOUT. A second terminal of the capacitor 156 is coupled to the ground node. A load RL and a potentiometer PT1 are coupled across the load RL. A center, adjustable terminal of the potentiometer PT1 forms a voltage VEA and is coupled to a positive input to an error amplifier 10. A negative input terminal of the error amplifier 10 is coupled to a reference voltage REF. An output of the error amplifier 10 is coupled to a positive input to a comparator 14.

A negative input to the comparator 14 is coupled to an oscillator 12 to receive a RAMP signal from the oscillator 12. An output of the comparator 14 is coupled to a set input S to a flip-flop 16. A $\overline{Q}$ output of the flip-flop 16 is coupled to a D input to the flip-flop 16. A CLK signal from the oscillator 12 is coupled to a CLK input to the flip-flop 16. A Q output of the flip-flop 16 is coupled to control the switch SW1 and coupled to an input to an inverter 150. An output of the inverter is coupled to control the switch SW2 so that switches SW1 and SW2 are in opposite states.

A CLK signal from the oscillator 12 is coupled to a CLK input to the flip-flop 16, to an input to a duty limit circuit 160 for controlling an "on" time of the switch SW3 and to a CLK input to a flip-flop 162. An output of the duty limit circuit 160 is coupled to a reset input R to flip-flop 162. A $\overline{Q}$ output of the flip-flop 162 is coupled to a D input to the flip-flop 162. A Q output of the flip-flop 160 is coupled to control the switch SW3 and to an input to an inverter 158. An output of the inverter 158 is coupled to control the switch SW4 so that switches SW3 and SW4 are in opposite states.

A detailed schematic diagram of an integrated circuit converter controller and a two stage power factor correction and pulse width modulation converter is shown in FIG. 11 and is available from Micro Linear Corporation, 2092 Concourse Drive, San Jose, Calif., Zip Code 95131, under part number ML4824. The integrated circuit 160 is implemented with 16 pins. While, the integrated circuit illustrated in FIG. 11 includes a power factor correction stage and a pulse width modulation stage, it is desirable to include these functions in an integrated circuit having fewer pins.

SUMMARY OF THE INVENTION

The invention is an integrated circuit controller for power factor correction circuit that provides unity power factor by sensing only a current in the power factor correction circuit and a dc supply voltage. The power factor correction circuit is coupled to a circuit for generating the dc supply voltage. Thus, the dc supply voltage is representative of the regulated output voltage of the power factor correction circuit. The dc supply voltage is sensed and integrated over each clock cycle and compared to an inverted and amplified version of the sensed current for controlling operation of the power factor correction circuit. By sensing the dc supply voltage, rather than the output voltage of the power factor correction circuit, the integrated circuit requires fewer pins.

In a preferred embodiment, the integrated circuit also includes a pulse width modulation controller circuit. Because a single clock signal is utilized for performing both leading edge modulation in the power factor correction circuit and trailing edge modulation in the pulse width modulation circuit, fewer pins are required. Therefore, the integrated circuit controller controls both the power factor correction circuit and the pulse width modulation circuit while the controller is contained within an eight-pin integrated circuit.

BRIEF DESCRIPTION OF THE DRAWINGS

FIG. 15 illustrates timing diagrams for the circuits of FIGS. 10 and 11.

DETAILED DESCRIPTION OF THE PREFERRED EMBODIMENT

Figure 12:
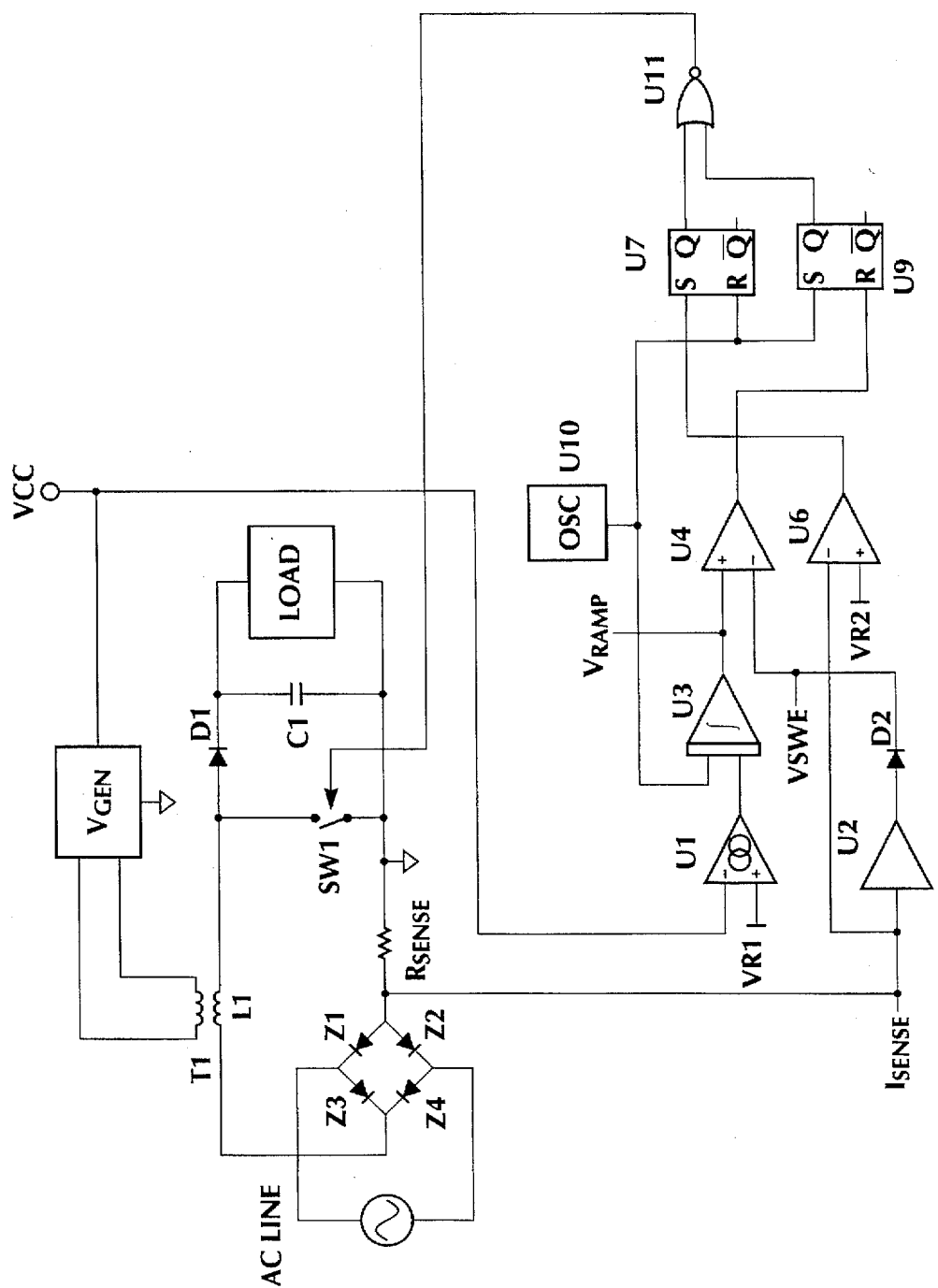
FIG. 12 illustrates a block schematic diagram of a power factor correction circuit of the present invention.

FIG. 12 illustrates block schematic diagram of a boost rectifier and power factor correction circuit of the present invention. An alternating current source VAC is coupled to a full-wave rectifier comprising diodes Z1, Z2, Z3, Z4. A first output terminal of the rectifier is coupled to a first terminal of an inductor L1. A second output terminal of the rectifier is coupled to a first terminal of a resistor RSENSE, to an input to an amplifier U2 and to a negative input to a comparator U6. A second terminal of the resistor RSENSE is coupled to a ground node.

A second terminal of the inductor L1 is coupled to a first terminal of a switch SW1 and to an anode of a diode D1. A second terminal of the switch SW1 is coupled to the ground node. A cathode of the diode D1 is coupled to a first terminal of a capacitor C1 and coupled to a first terminal of a load. A second terminal of the capacitor C1 and a second terminal of the load are coupled to the ground node.

The inductor L1 forms a primary winding of a transformer T1. A secondary winding of the transformer T1 is coupled to a circuit Vgen for forming a voltage VCC. An output of the circuit Vgen is coupled to a negative input to an amplifier U1. A positive input to the amplifier U1 is coupled to a reference voltage source VR1. An output of the amplifier U1 is coupled to an input to an integrator circuit U3. An output of the integrator circuit U3 forms a signal VRAMP and is coupled to a positive input to a comparator U4.

An output of the amplifier U2 is coupled to an anode of a diode D2. A cathode of the diode D2 forms a signal VSINE and is coupled to a negative input to the comparator U4. An output of the comparator U4 is coupled to a reset input R of a flip-flop U9. A positive input to the comparator U6 is coupled to a reference voltage VR2. An output of the comparator U6 is coupled to a set input S of a flip-flop U7. An oscillator U10 for generating a clock signal is coupled to a reset input R of the flip-flop U7, to a set input S of the flip-flop U9 and coupled to a initialization input to the integrator circuit U3. A Q output of the flip-flop U7 is coupled to a first input to a NOR gate U11. A Q output of the flip-flop U9 is coupled to a second input to the NOR gate U11. An output of the NOR gate U11 is coupled to control the state of the switch SW1.

Figure 13A:
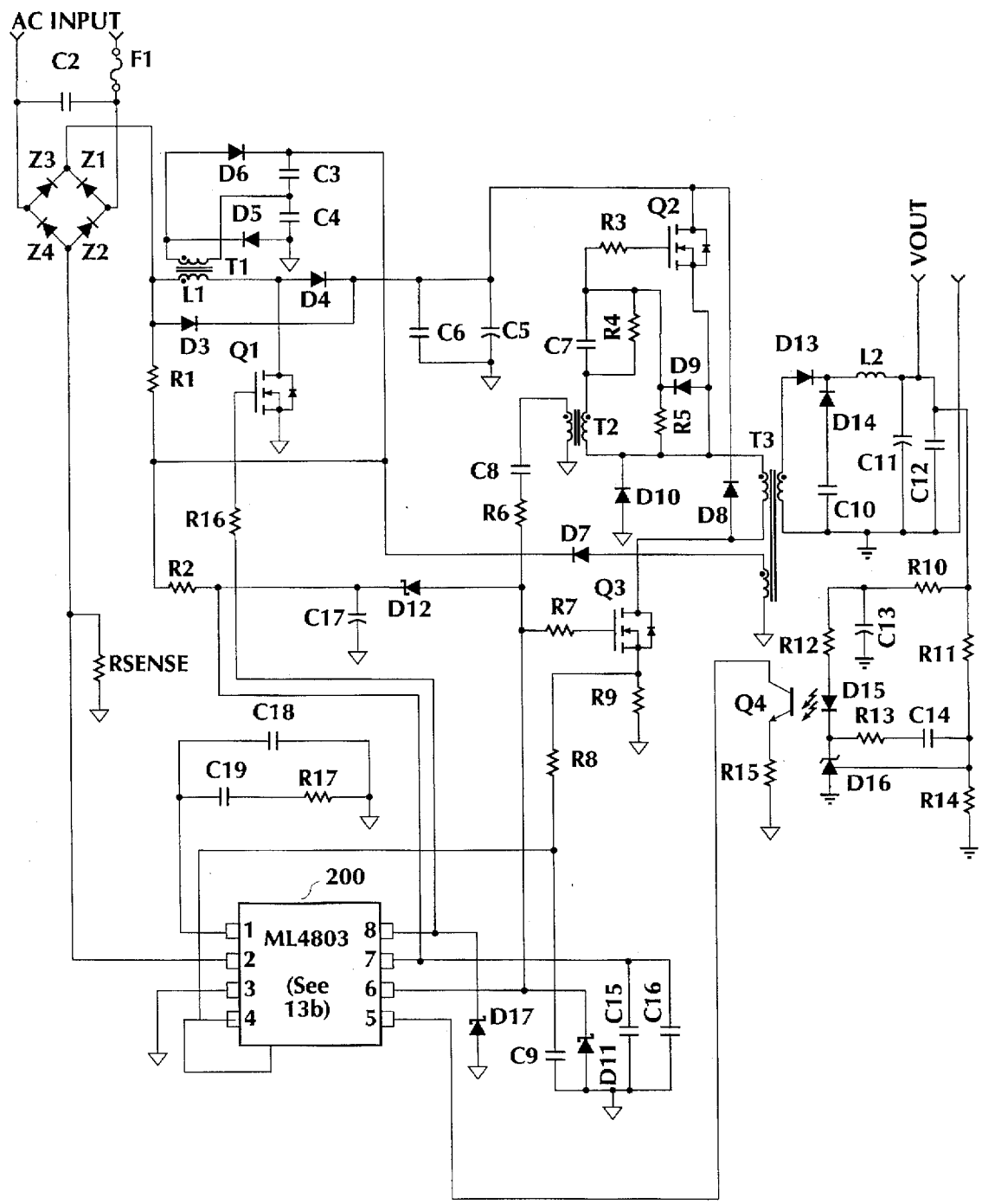
FIG. 13 illustrates a detailed schematic diagram of the power factor correction circuit and pulse width modulation circuit of the present invention.
Figure 13B:
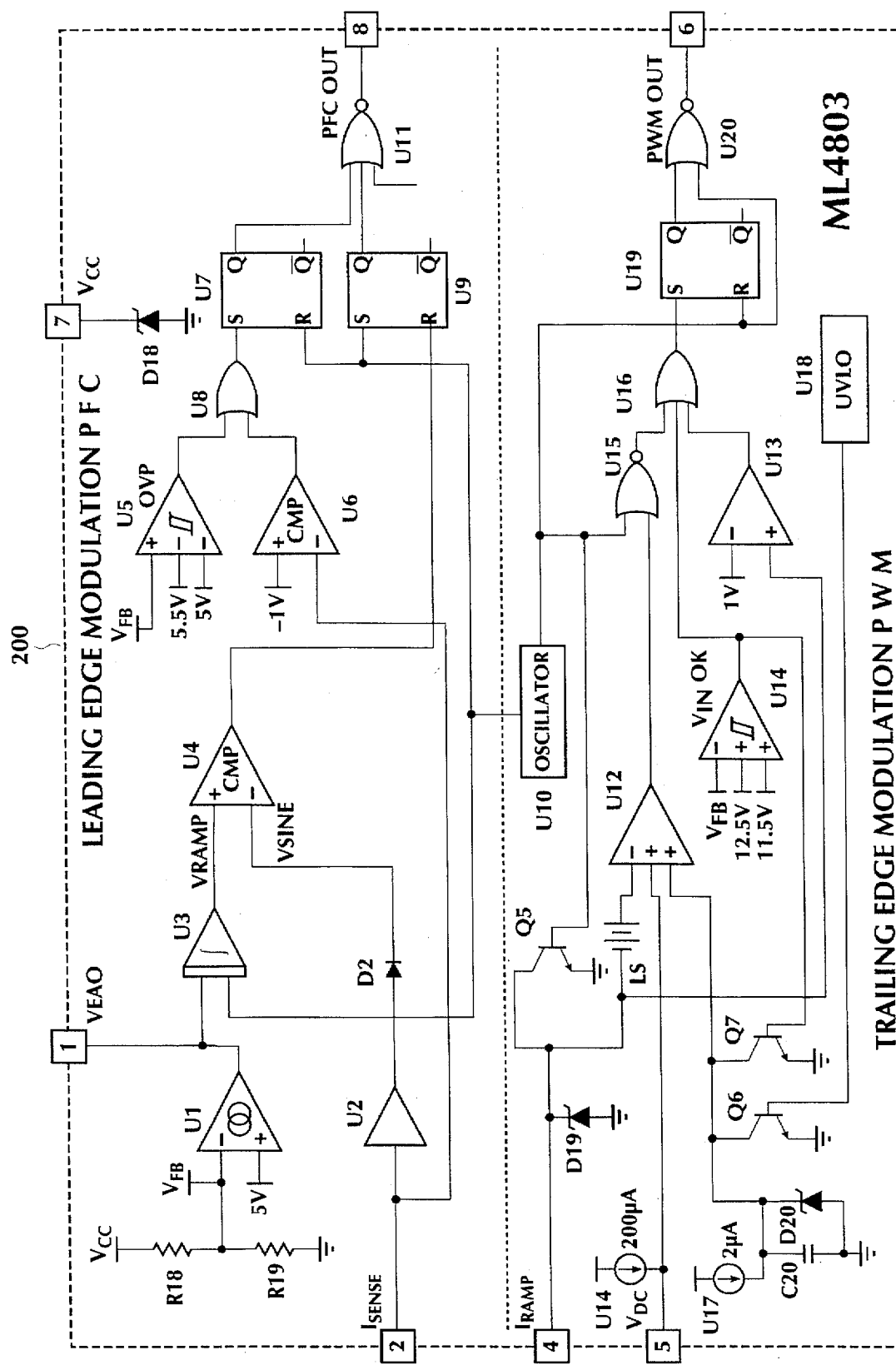

FIG. 13 illustrates a detailed schematic diagram of the present invention including an integrated circuit controller 200 and external components for implementing a power factor correction stage, a pulse width modulation stage and for generating VCC. It is anticipated that the integrated circuit 200 will be available under part number ML4803 from Micro Linear Corporation, located at 2092 Concourse Drive, in San Jose, Calif., Zip Code 95131.

Referring to portions of FIG. 13 external to the integrated circuit 200, a first terminal of an AC voltage source VAC is to coupled to a first terminal of a capacitor C2 and to a first input terminal of a full-wave rectifier comprising diodes Z1, Z2, Z3, Z4. A second terminal of the AC voltage source is coupled to a second terminal of the capacitor C2 and to a second input terminal of the rectifier. A first output terminal of the rectifier is coupled to a first terminal of an inductor L1, to an anode of a diode D3 and to a first terminal of a resistor R1. A second terminal of the inductor L1 is coupled to an anode of a diode D4 and to a drain of an NMOS transistor Q1. A source of the transistor Q1 is coupled to a primary ground node.

The inductor L1 is a primary winding of a transformer T1 wherein the first terminal of the inductor L1 is designated with a "dot" according to the dot convention for designating winding polarity. A first terminal of a secondary winding of the transformer T1 is designated with a dot and is coupled to a cathode of a diode D5 and to an anode of a diode D6. An cathode of the diode D6 is coupled to a first terminal of a capacitor C3, to a second terminal of the resistor R1, to a first terminal of a resistor R2 and to a cathode of a diode D7.

A second terminal of the capacitor C3 is coupled to a first terminal of a capacitor C4 and to a second terminal of the secondary winding of the transformer T1. An anode of the diode D5 is coupled to a second terminal of the capacitor C4 and coupled to the primary ground node. A cathode of the diode D3 is coupled to a cathode of the diode D4, to a first terminal of a capacitor C5, to a first terminal of a capacitor C6, to a drain of an NMOS transistor Q2 and to a cathode of a diode D8. A second terminal of the capacitor C5 and a second terminal of the capacitor C6 are coupled to the primary ground node.

A second output terminal of the rectifier comprising the diodes Z1, Z2, Z3, Z4, is coupled to a first terminal of a resistor RSENSE and to a pin 2, labelled ISENSE, of the integrated circuit 200. A second terminal of the resistor RSENSE is coupled to the primary ground node.

A gate of the transistor Q2 is coupled to a first terminal of a resistor R3. A second terminal of the resistor R3 is coupled to a first terminal of a resistor R4, to a first terminal of a capacitor C7, to a first terminal of a resistor R5 and to a cathode of a diode D9. A second terminal of the resistor R4 is coupled to a second terminal of the capacitor C7 and to a first terminal of a secondary winding of a transformer T2 wherein the first terminal of the secondary winding is designated with a dot. A second terminal of the secondary winding of the transformer T2 is coupled to an anode of the diode D9, to a second terminal of the resistor R5, to a source of the transistor Q2, to a first terminal of a primary winding of a transformer T3, designated with a dot, and to a cathode of a diode D10.

A first terminal, designated with a dot, of a secondary winding of the transformer T2 is coupled to a first terminal of a capacitor C8. A second terminal of the capacitor C8 is coupled to a first terminal of a resistor R6. A second terminal of the resistor R6 is coupled to a first terminal of a resistor R7, to a pin 6, labelled PWMOUT, of the integrated circuit 200, to a cathode of a Zener diode D11 and to an anode of a Zener diode D12. A second terminal of the resistor R7 is coupled to a gate of an NMOS transistor Q3. An anode of the diode D11 is coupled to the primary ground node. A drain of the transistor Q3 is coupled to an anode of the diode D8 and to a second terminal of the primary winding of the transformer T3.

A source of the transistor Q3 is coupled to a first terminal of a resistor R8 and to a first terminal of a resistor R9. A second terminal of the resistor R8 is coupled to a first terminal of a capacitor C9 and to a pin 4, labelled IRAMP, of the integrated circuit 200. A second terminal of the capacitor C9 and a second terminal of the resistor R9 are coupled to the primary ground node. A first terminal, designated with a dot, of a first secondary winding of the transformer T3 is coupled to an anode of a diode D13. A cathode of the diode D13 is coupled to a cathode of a diode D14 and to a first terminal of an inductor L2.

A second terminal of the first secondary winding of the transformer T3 is coupled to a secondary ground node. A first terminal, designated with a dot, of a second secondary winding of the transformer T3 is coupled an anode of the diode D7. A second terminal of the second secondary winding of the transformer T3 is coupled to the primary ground node. An anode of the diode D14 and a first terminal of a capacitor C10 are coupled to the secondary ground node. A second terminal of the capacitor C10 and an anode of the diode D10 are coupled to the primary ground node. A second terminal of the inductor L2 is coupled to a first terminal of a capacitor C11, to a first terminal of a capacitor C12, to an output node VOUT, to a first terminal of a resistor R10 and to a first terminal of a resistor R11. A second terminal of the capacitor C11 and a second terminal of the capacitor C12 are coupled to the secondary ground node.

A second terminal of the resistor R10 is coupled to a first terminal of a resistor R12 and to a first terminal of a capacitor C13. A second terminal of the resistor R12 is coupled to an anode of a light emitting diode D15. A second terminal of the diode D15 is coupled to a first terminal of a resistor R13 and to a cathode of a diode D16. Light from the diode D15 is coupled to control a transistor Q4. A second terminal of the resistor R13 is coupled to a first terminal of a capacitor C14. A second terminal of the capacitor C14 is coupled to a second terminal of the resistor R11, to a first terminal of a resistor R14 and coupled to a control terminal of the diode D16. An anode of the diode D16, a second terminal of the resistor R14 and a second terminal of the capacitor C13 are coupled to the secondary ground node.

An emitter of the transistor Q4 is coupled to a first terminal of a resistor R15. A second terminal of the resistor R15 is coupled to the primary ground node. A collector of the transistor Q4 is coupled to a pin 5, labelled VDC, of the integrated circuit 200. A gate of the transistor Q1 is coupled to a first terminal of a resistor R16. A second terminal of the resistor R16 is coupled to a pin 8, labelled PFCOUT, of the integrated circuit 200 and to a cathode of a zener diode D17. An anode of the diode D17 is coupled to the primary ground node.

A cathode of the diode D12 is coupled to a second terminal of the resistor R2, to a first terminal of a capacitor C15, to a first terminal of a capacitor C16, to a first terminal of a capacitor C17 and to a pin 7, labelled VCC, of the integrated circuit 200. A second terminal of the capacitor C15, a second terminal of a capacitor C16 and a second terminal of a capacitor C17 are coupled to the primary ground node. A pin 1, labeled VEAO, of the integrated circuit 200 is coupled to a first terminal of a capacitor C18 and to a first terminal of a capacitor C19. A second terminal of the capacitor C19 is coupled to a first terminal of a resistor R17. A second terminal of the capacitor C18, a second terminal of the resistor R17 and a pin 3, labelled GND, of the integrated circuit 200 are coupled to the primary ground node.

Referring to portions of FIG. 13 internal to the integrated circuit 200, pin 2 is coupled to an input to an amplifier U2 having a gain of minus eight and to a negative input to a comparator U6. A positive input to the comparator U6 is coupled to a −1.0 volts reference voltage. An output of the amplifier U2 is coupled to an anode of a diode D2. A cathode of the diode D2 is coupled to a positive input to a comparator U4. A first terminal of a resistor R18 is coupled to VCC (pin 7). A second terminal of the resistor R18 forms a node VFB and is coupled to a negative input to an amplifier U1 and to a first terminal of a resistor R19. A second terminal of the resistor R19 is coupled to the primary ground node. A positive input to the amplifier U1 is coupled to a reference voltage of 5.0 volts. An output of the amplifier U1 is coupled to the pin 1 and coupled to an input to an integrator circuit U3. An output of the integrator circuit U3 is coupled to a positive input to the comparator U4. The integrator circuit U3 is also coupled to receive a clock signal from an oscillator U10 for initializing the integrator circuit U3.

A positive input to a hysteretic comparator U5 is also coupled to the node VFB. A first negative input to the hysteretic comparator U5 is coupled to a 5.5 volts reference voltage. A second negative input to the hysteretic comparator U5 is coupled to a 5.0 volts reference voltage. An output of the comparator U5 is coupled to a first input to an OR gate U8. An output of the comparator U6 is coupled to a second input to the OR gate U8. An output of the OR gate U8 is coupled to a set input S of a flip-flop U7. An output of the comparator U4 is coupled to a reset input R of a flip-flop U9. A reset input R of the flip-flop U7 and a set input S of the flip-flop U9 are coupled to receive the clock signal from the oscillator U10.

A Q output of the flip-flop U7 is coupled to a first input to a NOR gate U11. A Q output of the flip-flop U9 is coupled to a second input to the NOR gate U11. An output of the NOR gate U11 is coupled to the pin 8. A cathode of a Zener diode D18 is coupled to the pin 7 for receiving VCC. An anode of the diode D18 is coupled to the primary ground node.

The pin 4 is coupled to a cathode of a zener diode D19, to a negative terminal of a 1.25 volt level shift circuit LS, to a positive input to a comparator U13 and coupled to a collector of an npn bipolar transistor Q5. A positive terminal of the 1.25 volt level shift circuit LS is coupled to a negative input to a comparator U12. A negative input to the comparator U13 is coupled to a reference voltage of 1.0 volt. An anode of the diode D19 is coupled to the primary ground node. A pin 5 of the integrated circuit 200 is coupled to a first positive input to the comparator U12 and coupled to receive a current of 200 micro-amps from a current source U14. A negative input to an hysteretic comparator U14 is coupled to the node VFB. A first positive input to the hysteretic comparator U14 is coupled to a 12.5 volts reference voltage. A second positive input to the hysteretic comparator is coupled to a 11.5 volts reference voltage.

An output of the hysteretic comparator U14 is coupled to a base of an npn bipolar transistor Q7 and to a first input to an OR gate U16. A collector of the transistor Q7 is coupled to a second positive input to a comparator U12, to a collector of an npn bipolar transistor Q6, to a cathode of a zener diode D20, to a first terminal of a capacitor C20 and coupled to receive a current of 2 micro-amps from a current source U17. An output of the comparator U12 is coupled to a first input to a NOR gate U5. An emitter of the transistor Q7, an emitter of the transistor Q6, an anode of the diode D20 and a second terminal of the capacitor C20 are coupled to the primary ground node. A base of the transistor Q6 is coupled to an under voltage detector circuit U18.

An output of the comparator U13 is coupled to a second input to the OR gate U16. An output of the NOR gate U15 is coupled to a third input to the OR gate U16. An output of the OR gate U16 is coupled to a set input S of a flip-flop U19. A Q output of the flip-flop U19 is coupled to a first input to a NOR gate U20. The oscillator U10 is coupled to provide a clock signal to a base of the transistor Q5, to a second input to the NOR gate U15, to a reset input R of the flip-flop U19 and to a second input to the NOR gate U20. An output of the NOR gate U20 is coupled to pin 6 of the integrated circuit.

The power factor correction circuit of the present invention compares the integrated signal VRAMP with the signal VSINE to control the duty cycle of the switch SW1 and to ensure that the rectifier input current follows the line voltage. When the value of the integrated signal VRAMP exceeds the value of the signal VSINE, the output of the comparator U4 rises to a logical high voltage level. The switch SW1 is then closed on the next rising edge of the clock signal. The signal VSINE is representative of the current flowing through the inductor L1.

The integrated signal VRAMP is generated by the amplifier U1 and the integrator circuit U3. Rather than use a feedback signal from a potentiometer PT1, the present invention accomplishes a similar result by integrating a signal VFB for each clock cycle. This is possible because VFB is proportionate to the dc supply voltage VCC formed by the circuit coupled to the secondary winding of the transformer T1 and is representative of the output voltage. Integrating VFB eliminates the need for a separate pin to couple the output voltage to the integrated circuit 200. Note that in FIG. 13, the integrated circuit 200 requires only 8 pins to implement both the power factor correction functions and the pulse width modulation functions.

Figure 14:
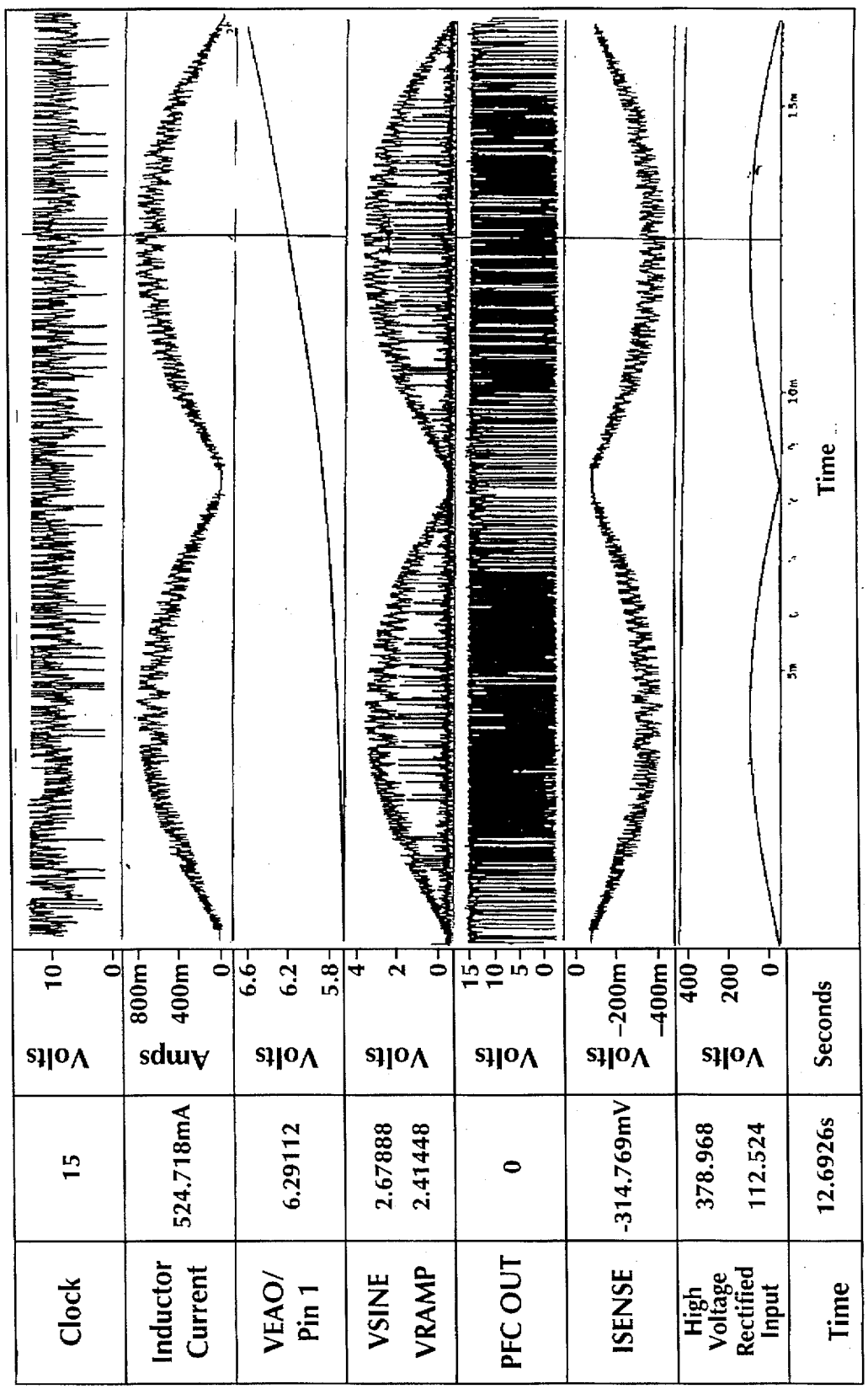
FIG. 14 illustrates timing diagrams for the circuits of FIGS. 10 and 11.

FIGS. 14 and 15 and illustrate timing diagrams for the circuits of FIGS. 12 and 13. Referring to FIGS. 12–15, the signal CLOCK is the clock signal generated by the oscillator U10. The INDUCTOR CURRENT signal is the current through the inductor L1. The VEAO signal is the voltage at the output of the amplifier U1. The signal VSINE is the signal at the negative input to the comparator U4. The signal VRAMP is the signal at the positive input to the comparator U4. The signal PFCOUT is the signal at the output of the NOR gate U11. The signal ISENSE is the signal at the input to U2. The HIGH VOLTAGE SIGNAL is the signal across the capacitors C5 and C6 is FIG. 13. The RECTIFIED INPUT signal is the voltage at the output of the rectifier and at the first terminal of the inductor L1.

During a period of the clock signal, the signal VRAMP rises until it is reset by the leading edge of the clock signal to the integrator circuit U3. Resetting the integrator assures that the signal VRAMP will have proper initial conditions for each clock cycle. At the beginning of the period of the clock signal, when the transistor Q1 (switch) is open, the output of the integrator U3 VRAMP rises. The switch Q1 is closed at the next leading edge of the clock signal after the signal VRAMP exceeds the value of the waveform VSINE. Thus, the power factor correction circuit utilizes leading edge modulation.

Because the current flows from ground through the sense resistor RSENSE, the voltage signal at the pin 2 to the integrated circuit is negative. Therefore, the amplifier U2 has a negative gain so that the signal VSINE has positive polarity for comparison with the signal VRAMP.

The voltage signal ISENSE representing the level of current flowing through the resistor RSENSE, which is input to the amplifier U2 is also input to the comparator U6. If the value of this voltage signal falls below −1 volts, then the output of the comparator U6 will rise to a logical high voltage. When the output of the comparator U6 rises to a logical high voltage, the output Q of the flip-flop U7 will rise to logical high voltage level, causing the output of the NOR gate U11 to fall to a logical low voltage level and the switch Q1 will be opened.

At the leading edge of the clock signal, the output of the NOR gate U11 falls to a logical low voltage level which opens the switch Q1 (SW1). The signals VSINE and VRAMP increase, according to their respective generating circuits, over a the clock period. When the signal VRAMP rises above the signal VSINE, the output of the comparator U4 rises to a logical high voltage causing the output Q of the flip-flop U9 to fall to logical low voltage level. Because all of the inputs to the NOR gate U11 are at a logical low voltage level, the output of the NOR gate U11 will rise to logical high voltage level, causing the switch Q1 to close.

The switch Q1 (SW1) stays closed until the leading edge of the next clock pulse. On the leading edge of the clock pulse, the output Q of the flip-flop U7 is reset to logical low voltage level, the output of the flip-flop U9 is set to logical high voltage level, the output of the NOR gate U11 is a logical low voltage level, the switch Q1 (SW1) is open and the integrator circuit U3 is reset to have initial output conditions of zero. The duty cycle of the switch Q1 (SW1) is therefore set between the time the integrated signal VRAMP rises above the signal VSINE and the leading edge of the clock signal.

The signal VRAMP is generated using only the amplifier U1 and the integrator U3 as shown in FIG. 13 and the signal VSINE is generated using only the amplifier U2 and diode D2 as shown in FIG. 13.

The pulse width modulation stage has as its input a voltage formed by the power factor correction stage of approximately 380 volts d.c. across the capacitors C5 and C6. The pulse width modulation section controls the transistor Q3 (SW3) to maintain a constant output voltage VOUT. Preferably, a single clock signal of the oscillator U10 controls both stages to realize synchronous switching of the two stages, but separate clock signals could be utilized.

The second stage of the power converter utilizes a trailing edge modulation scheme in which the duty cycle of the switch Q3 (SW3) is ideally held constant, but will vary as the voltage across the capacitor 152 varies. Preferably, a single clock signal controls both stages to realize synchronous switching of the two stages, but separate clock signals could be utilized. The duty cycle of the second stage is ideally held constant at fifty percent, but will vary to maintain a constant output voltage. The pulse width modulation stage operates in much the same manner as the pulse width modulation stage shown in FIG. 11.

Thus, a power factor correction circuit having a simple construction is described and an integrated circuit including both a power factor correction circuit and a pulse width modulation circuit having a minimum number of pins is described.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

Specifically, it will be apparent to one of ordinary skill in the art that the device of the present invention could be implemented in several different ways and the apparatus disclosed above is only illustrative of the preferred embodiment of the invention and is in no way a limitation. For example, it would be within the scope of the invention to vary the values of the various components and voltage levels disclosed herein. In addition, it will be apparent that a transistor of one type, such as NMOS, PMOS, bipolar pnp or bipolar npn can be interchanged with a transistor of another type, and in some cases interchanged with a diode, with appropriate modifications of the remaining circuitry, and so forth.

What is claimed is:

1. A power converter circuit comprising:
   a. a switching mode power factor correction circuit comprising a first inductor and a second inductor inductively coupled to the first inductor wherein a first current in the first inductor charges an output capacitor and a second current in the second inductor is induced by the first current and provides power for generating a dc supply voltage; and
   b. a control circuit for controlling switching of the power factor correction circuit for maintaining the first current in phase with an input voltage wherein the control circuit senses the dc supply voltage for controlling switching.

2. The circuit according to claim 1 wherein the control circuit is contained in an integrated circuit chip and wherein the dc supply voltage powers the integrated circuit chip.

3. The power converter circuit according to claim 1 wherein the control circuit includes means for controlling switching of a pulse width modulation circuit.

4. The power converter circuit according to claim 3 further comprising a pulse width modulation circuit coupled in cascade with the power factor correction circuit.

5. The power converter circuit according to claim 3 wherein the control circuit performs leading edge modulation for controlling switching of the power factor correction circuit and wherein the control circuit performs trailing edge modulation for controlling switching of the pulse width modulation circuit wherein the leading edge modulation and the trailing edge modulation are performed according to a single clock signal.

6. The power factor correction circuit according to claim 3 wherein the controller circuit is contained within an integrated circuit chip having eight or fewer pins.

7. A power converter circuit comprising:
  a. an inductor coupled to receive a first current from a rectified supply;
  b. a first switch coupled to control the first current for storing energy in the inductor;
  c. a capacitor coupled to the inductor for receiving energy from the inductor for forming a first output voltage;
  d. a control circuit including means for controlling the first switch;
  e. means for forming a dc supply voltage for powering the control circuit wherein the dc supply voltage is representative of the first output voltage;
  f. means for sensing the first current coupled to the means for controlling the first switch; and
  g. means for sensing the dc supply voltage coupled to the means for controlling the first switch.

8. The power converter circuit according to claim 7 wherein the means for controlling the first switch comprises:
  a. means for forming a voltage representative of the first current coupled to the means for sensing the first current;
  b. means for integrating for forming an integrated signal by integrating over each of a series of clock cycles of a clock signal, a difference between a reference voltage and the dc supply voltage, the means for integrating coupled to the means for sensing the dc supply voltage;
  c. means for comparing the voltage representative of the first current to the integrated signal for forming a first switch control signal wherein the means for comparing is coupled to the means for forming and to the means for integrating and wherein the first switch is controlled to open and to close based upon the first switch control signal and the clock signal.

9. The power converter circuit according to claim 8 further comprising a pulse width modulation stage coupled to receive the first output voltage for forming a second output voltage, the pulse width modulation stage comprising a second switch.

10. The power converter circuit according to claim 9 wherein the control circuit further comprises means for controlling the second switch, the means for controlling the second switch comprising:
  a. means for sensing a second current in the pulse width modulation stage;
  b. means for sensing the second output voltage; and
  c. means for forming a second switch control signal for controlling the second switch wherein the means for forming is coupled to the means for sensing the second current and coupled to the means for sensing the second output voltage and wherein the second switch is controlled to open and to close based upon the second switch control signal and the clock signal.

11. The power converter circuit according to claim 10 wherein the means for controlling the first switch performs leading edge modulation and the wherein the means for controlling the second switch performs trailing edge modulation.

12. The power converter circuit according to claim 11 wherein the control circuit is contained in an integrated circuit wherein the integrated circuit requires not more than eight pins.

13. A power converter circuit comprising:
  a. a rectifier having a positive output terminal and a negative output terminal;
  b. a transformer having a primary winding and a secondary winding wherein a first terminal of the primary winding is coupled to the positive output terminal;
  c. a diode having an anode and a cathode, wherein the anode is coupled to a second terminal of the primary winding;
  d. a first switch having a first terminal and a second terminal wherein the first terminal of the first switch is coupled to the second terminal of the primary winding and wherein the second terminal of the first switch is coupled to a ground node;
  e. a generating circuit for forming a dc supply voltage coupled to the secondary winding;
  f. a capacitor having a first terminal and a second terminal wherein the first terminal of the capacitor is coupled to the cathode and the second terminal of the capacitor is coupled to the ground node;
  g. a resistor having a first terminal and a second terminal wherein the first terminal of the resistor is coupled to the negative output terminal and the second terminal of the resistor is coupled to the ground node;
  h. an amplifier having an input and an output wherein the input of the amplifier is coupled to the first terminal of the resistor;
  i. a transconductor having a positive input, a negative input and an output wherein the positive input of the transconductor is coupled to receive a first reference voltage and the negative input of the transconductor is coupled to receive a voltage representative of the dc supply voltage;
  j. an integrator having an input, an output and a reset terminal wherein the input of the integrator is coupled to the output of the transconductor;
  k. a first comparator having a positive input, a negative input and an output wherein the positive input of the first comparator is coupled to the output of the integrator and the negative input of the first comparator is coupled to the output of the amplifier;
  l. a second comparator having a positive input, a negative input and an output, wherein the positive input of the second comparator is coupled to receive a second reference voltage and the negative input of the second comparator is coupled to the first terminal of the resistor;
  m. a first flip-flop having a set input, a reset input and an output wherein a reset input of the first flip-flop is coupled to the output of the first comparator;
  n. a second flip-flop having a set input, a reset input and an output wherein a set input of the second flip-flop is coupled to the output of the second comparator;
  o. an oscillator having an output for forming a clock signal wherein the output of the oscillator is coupled to the reset terminal of the integrator, to the set input of the first flip-flop and to the reset input of the second flip-flop; and p. a logical NOR gate having a first input, a second input and an output wherein the output of the first flip-flop is coupled to the first input of the NOR gate and the output of the second flip-flop is coupled to the second input of the NOR gate and the output of the NOR gate is coupled to control a state of the first switch.

14. The power factor correction circuit according to claim 13 further comprising a load coupled across the capacitor.

15. The power factor correction circuit according to claim 14 wherein the load comprises a pulse width modulation circuit comprising a second switch.

16. The power factor correction circuit according to claim 15 wherein the amplifier, the transconductor, the integrator, the first comparator, the second comparator, the oscillator, the first flip-flop, the second flip-flop and the NOR gate are all contained within a single integrated circuit and wherein the single integrated circuit further comprises means for controlling the second switch.

17. The power factor correction circuit according to claim 16 wherein the means for controlling the first switch performs leading edge modulation and the wherein the means for controlling the second switch performs trailing edge modulation.

18. The power factor correction circuit according to claim 17 wherein the integrated circuit requires not more than eight pins.

19. A method of ensuring that an input current of a power converter follows an input voltage of the power converter in time and amplitude proportionately, the method comprising the steps of:

a. forming an input current in an inductor for storing energy in the inductor by closing a switch;

b. transferring energy from the inductor into a capacitor for forming an output voltage across the capacitor by opening the switch;

c. forming a voltage representative of the input current;

d. forming a dc supply voltage for an integrated circuit, wherein the dc supply voltage is representative of the output voltage; and e. controlling opening and closing the switch according to the dc supply voltage and the voltage representative of the input current.

20. The method according to claim 19 wherein the step of controlling opening and closing the switch further comprises steps of:

a. sensing the dc supply voltage;

b. amplifying the voltage representative of the input current for forming an amplified first signal;

c. amplifying a difference between the dc supply voltage and a reference voltage for forming an amplified difference signal;

d. integrating the amplified difference signal over a each of a series of clock cycles of a clock signal for forming an integrated signal;

e. comparing the amplified difference signal to the integrated voltage for forming a switch control signal; and f. controlling opening and closing the switch according to the switch control signal and the clock signal.

21. A method of ensuring that an input current of a power converter follows an input voltage of the power converter in time and amplitude proportionately, the method comprising the steps of:

a. forming an input current in an inductor for storing energy in the inductor by closing a switch;

b. transferring energy from the inductor into a capacitor for forming an output voltage across the capacitor by opening the switch;

c. forming a voltage representative of the input current;

d. inductively coupling a dc supply generating circuit to the inductor for forming a dc supply voltage; and e. controlling opening and closing the switch according to the dc supply voltage and the voltage representative of the input current.

22. The method according to claim 21 wherein the step of controlling opening and closing the switch further comprises steps of:

a. sensing the dc supply voltage;

b. amplifying the voltage representative of the input current for forming an amplified first signal;

c. amplifying a difference between the dc supply voltage and a reference voltage for forming an amplified difference signal;

d. integrating the amplified difference signal over a each of a series of clock cycles of a clock signal for forming an integrated signal;

e. comparing the amplified difference signal to the integrated voltage for forming a switch control signal; and f. controlling opening and closing the switch according to the switch control signal and the clock signal.

* * * * *

UNITED STATES PATENT AND TRADEMARK OFFICE
CERTIFICATE OF CORRECTION

PATENT NO. : 5,742,151

DATED : April 21, 1998

INVENTOR(S) : Jeffrey Hwang

It is certified that error appears in the above-indentified patent and that said Letters Patent is hereby corrected as shown below:

On the title page, in the Reference Cited:

Delete, "Nonlinear-Carrier Control for High Power Factor Boost Rectifiers," and insert --"Nonlinear-Carrier Control for High Power Factor Boost Rectifiers--.

In column 2, line 26, delete "and mining off" and insert --and turning off--.

In column 5, line 48, delete "or mining on" and insert --and turning on--.

Figure 1:
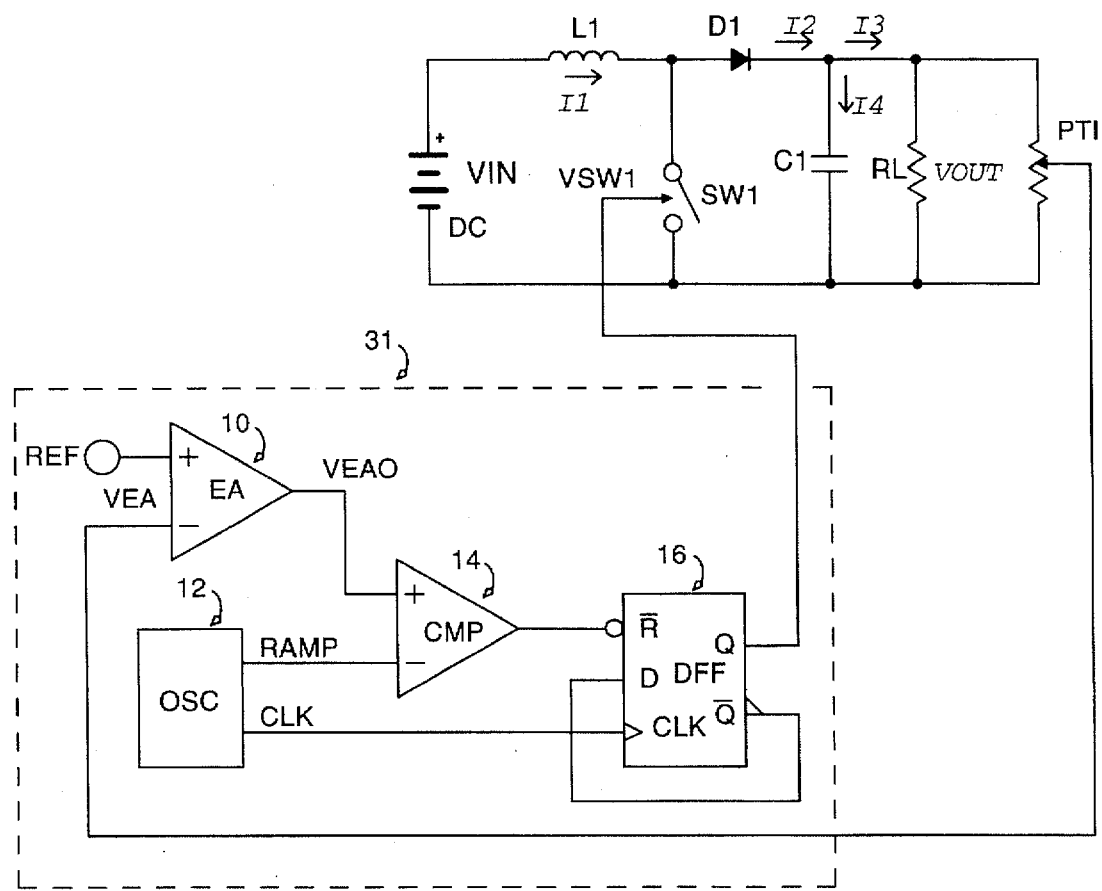
FIG. 1 illustrates a schematic diagram of a switching mode power converter of the prior art.
Figure 2:
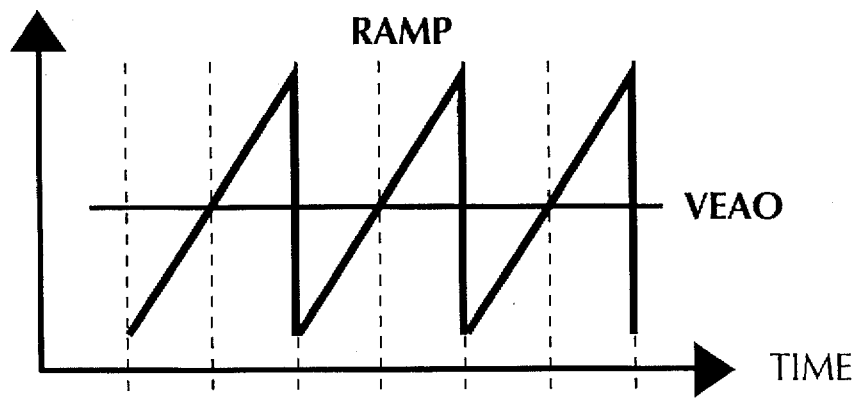
FIG. 2 illustrates a timing diagram of the voltage levels of the error amplifier output VEAO and the modulating ramp output of the oscillator of the switching mode power converter of FIG. 1.
Figure 3:
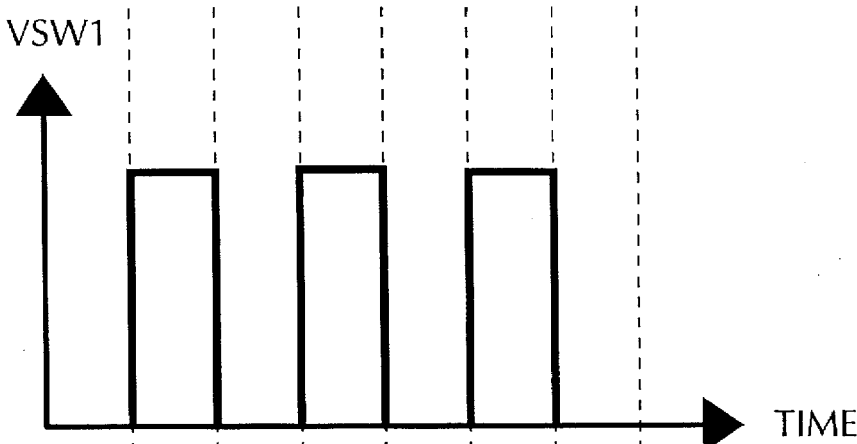
FIG. 3 illustrates a timing diagram of the control voltage VSW1 of the switching mode power converter of FIG. 1.
Figure 4:
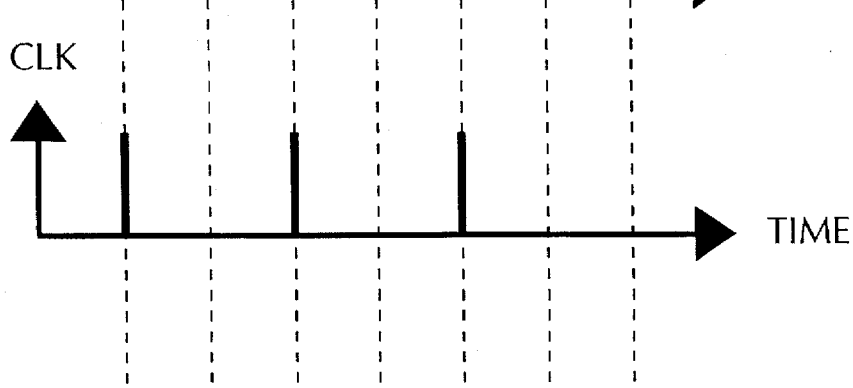
FIG. 4 illustrates a timing diagram of the clock output of the oscillator 12 of the switching mode power converter of FIG. 1.
Figure 5:
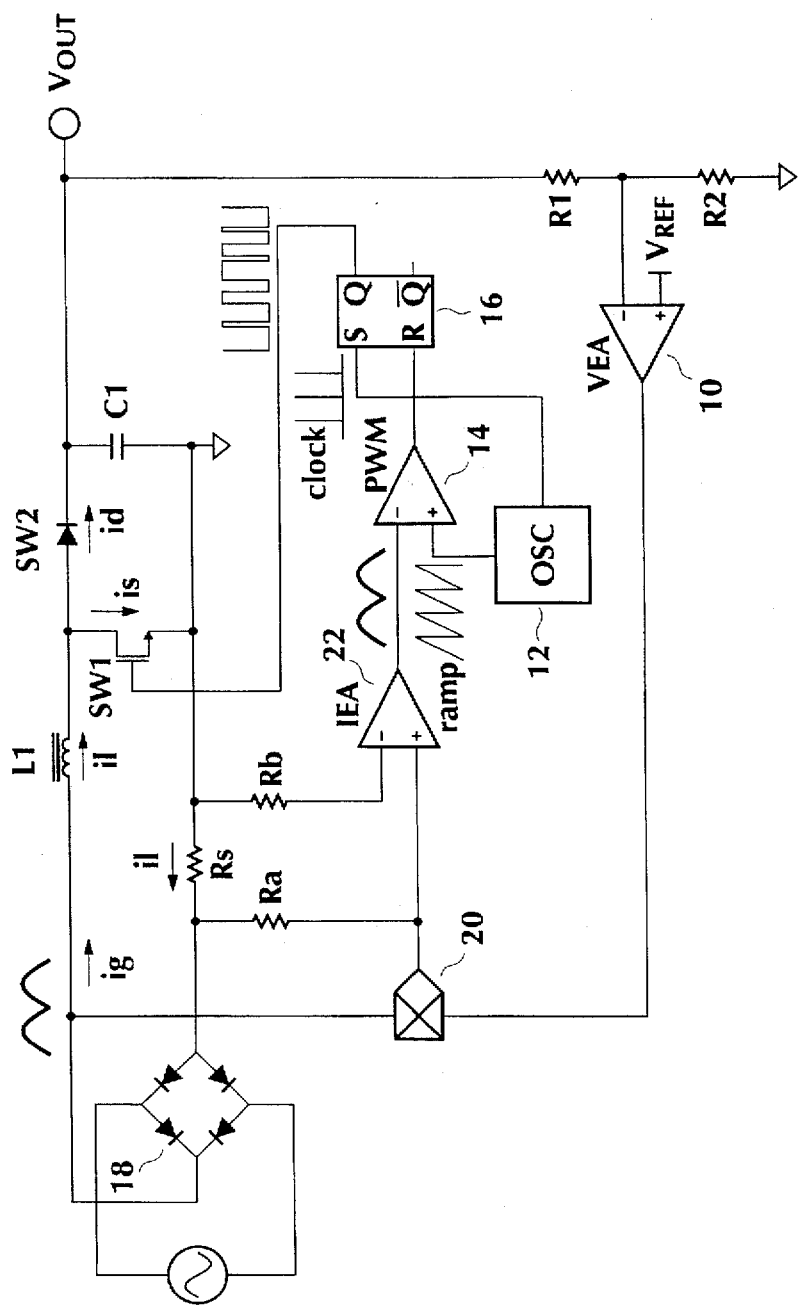
FIG. 5 illustrates a block diagram schematic of a boost rectifier of the prior art including a power factor controller circuit.
Figure 6:
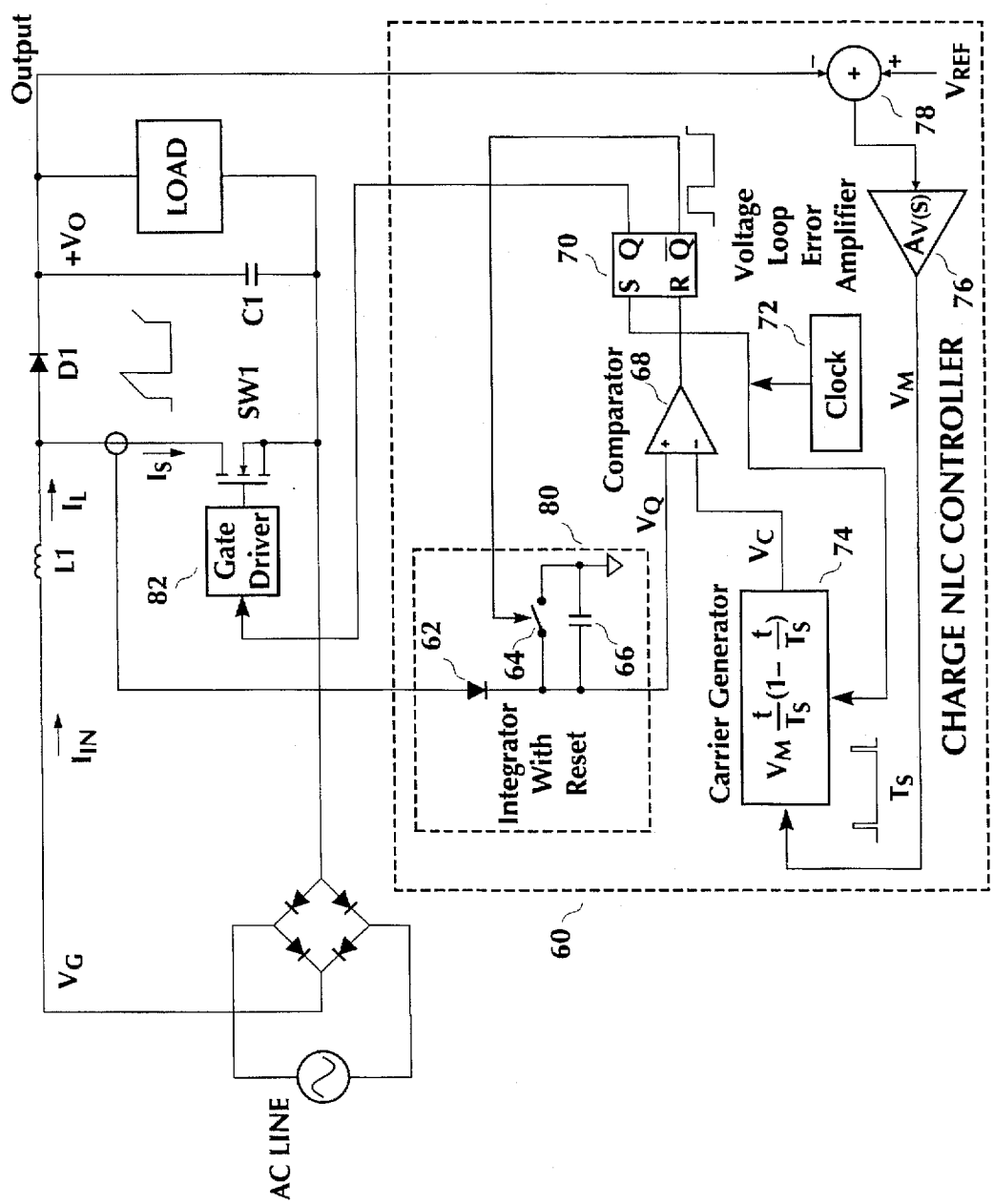
FIG. 6 illustrates a block diagram schematic of a boost rectifier of the prior art including a nonlinear carrier power factor controller circuit.
Figure 7:
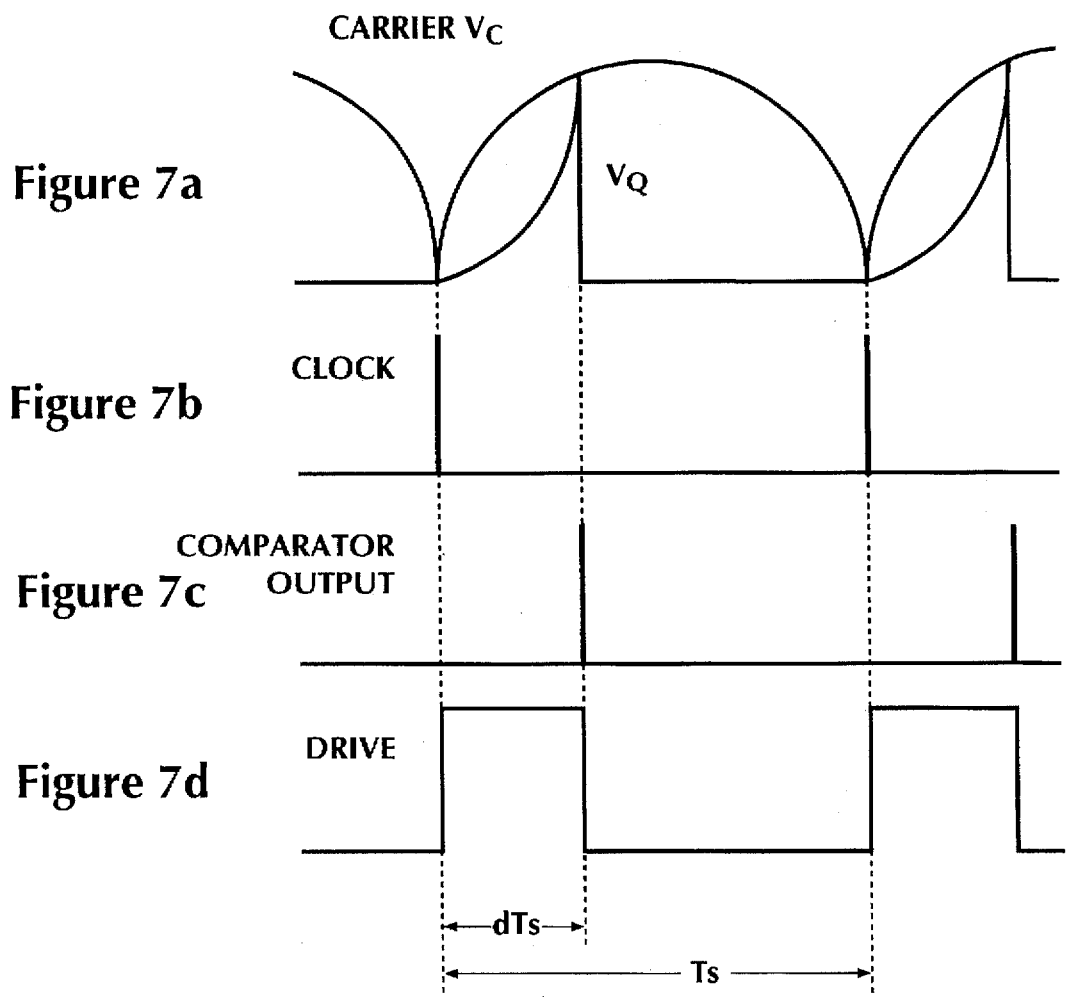
FIG. 7a illustrates a timing diagram of two signals Vq and Vc which are input to and compared by the comparator 68 of the power factor controller circuit of FIG. 6.
FIG. 7b illustrates a timing diagram of the clock signal output by the oscillator 72 of the power factor controller circuit of FIG. 6.
FIG. 7c illustrates a timing diagram of the output of the comparator 68 of the power factor controller circuit of FIG. 6.
FIG. 7d illustrates a timing diagram of the output of the gate driver circuit 82 of the power factor controller circuit of FIG. 6.
Figure 8:
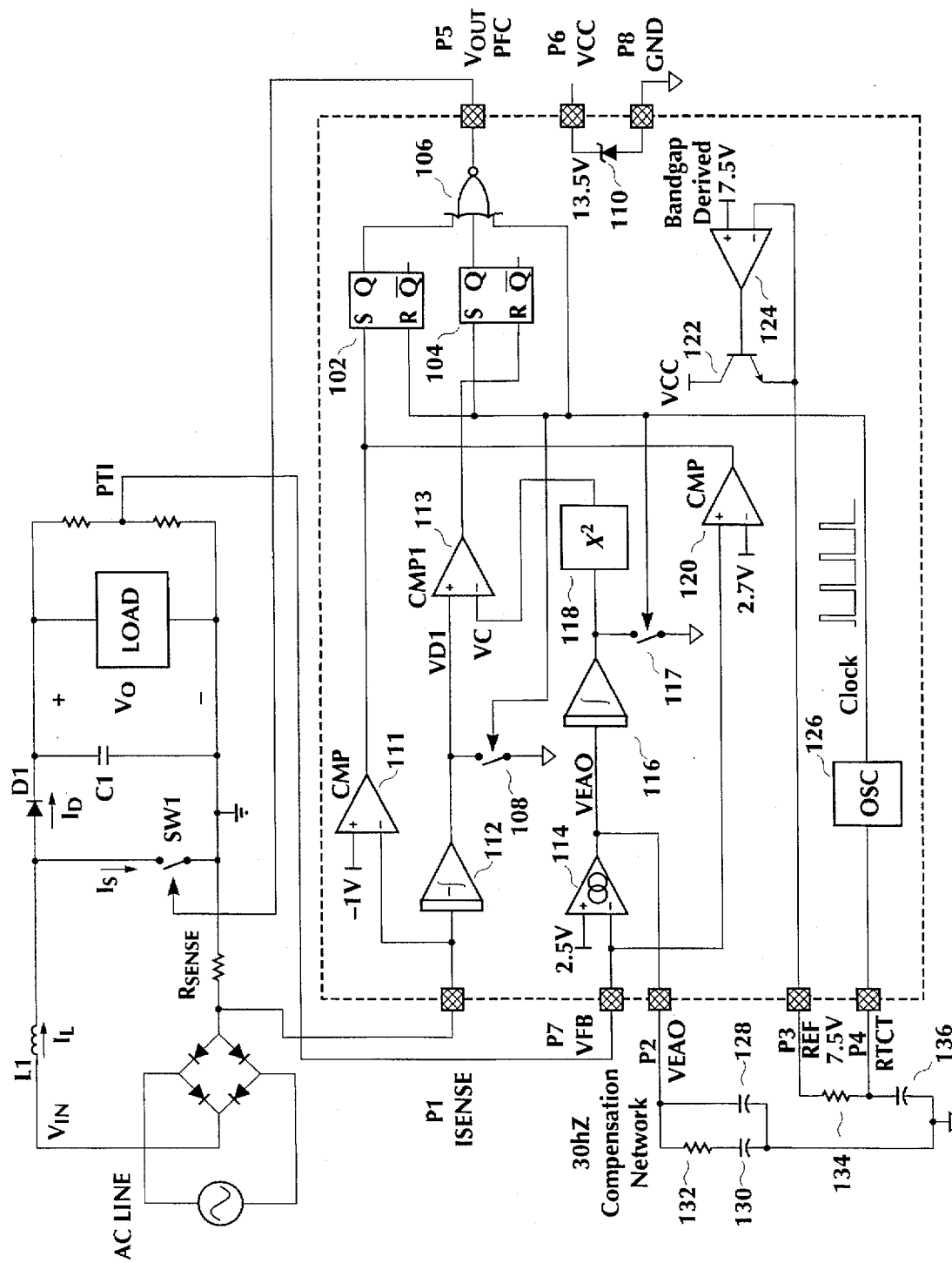
FIG. 8 illustrates a block diagram schematic of a boost converter configured as a leading edge power factor correction circuit.
Figure 9A:
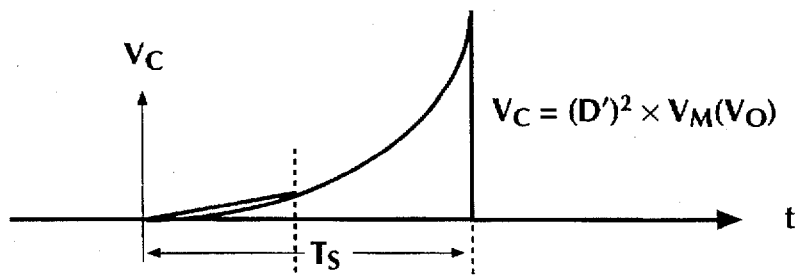
FIG. 9a illustrates a timing diagram of the carrier waveform Vc of the circuit of FIG. 8.
Figure 9B:
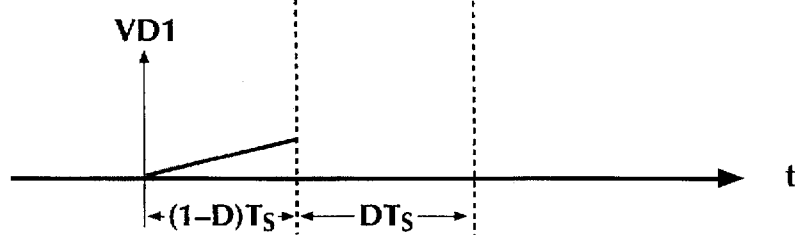
FIG. 9b illustrates a timing diagram of the signal VD1 representing the current through the diode D1 of the circuit of FIG. 8.
Figure 9C:
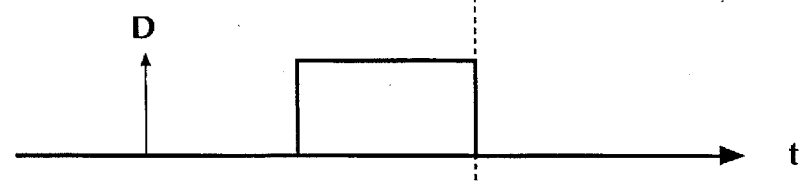
FIG. 9c illustrates a timing diagram of the duty cycle D of the switch S1 of the circuit of FIG. 8.
Figure 9D:
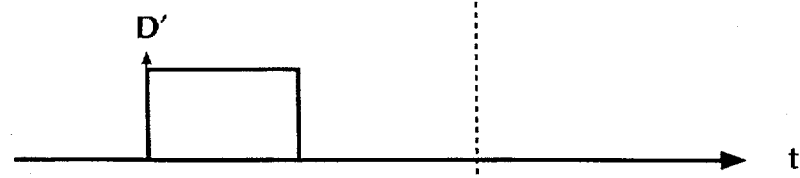
FIG. 9d illustrates a timing diagram of the time D' when the switch S1 is off within the circuit of FIG. 8.
Figure 9E:
FIG. 9e illustrates a timing diagram of the clock reference signal Clock within the circuit of FIG. 8.
Figure 10:
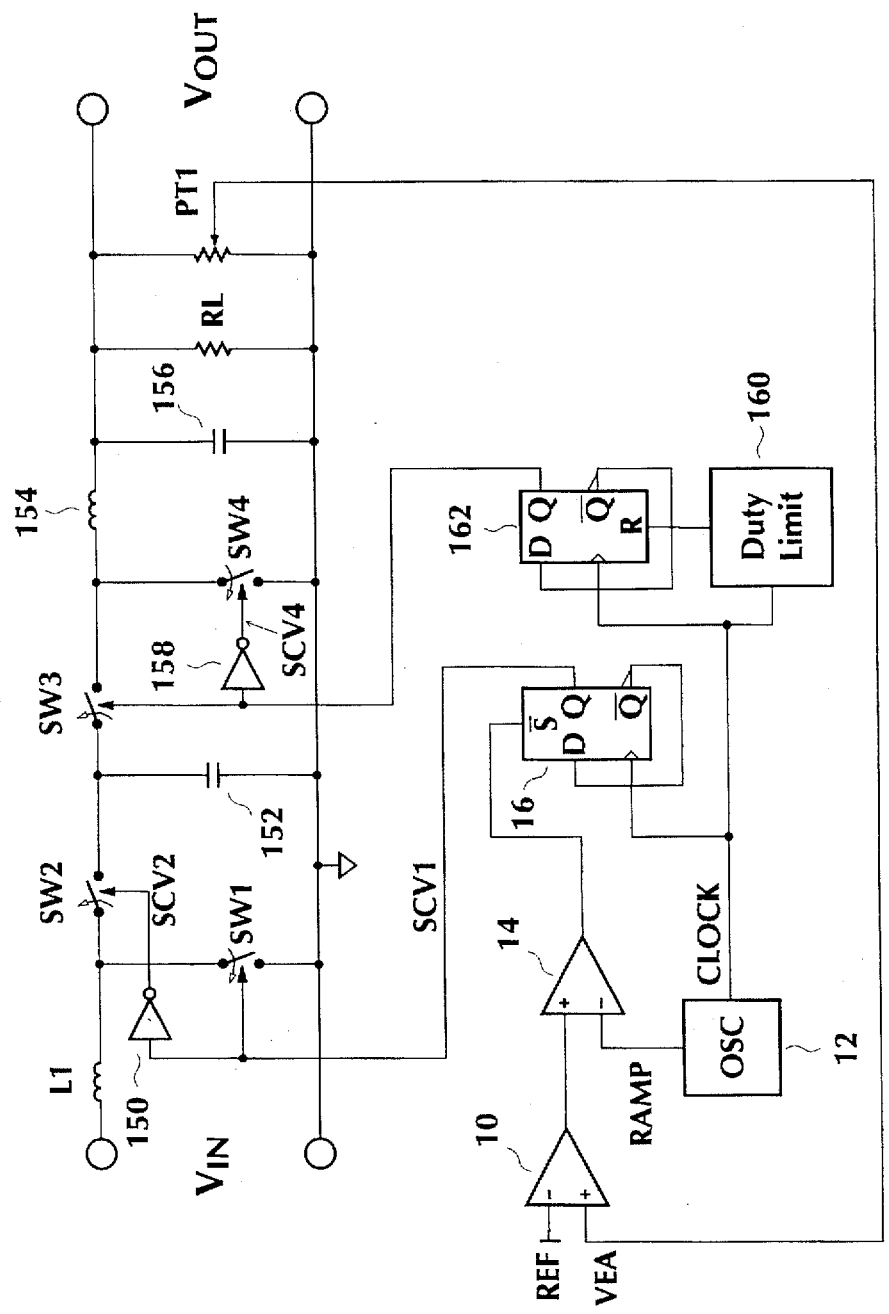
FIG. 10 illustrates a block schematic of a power factor correction circuit and a pulse width modulation circuit of the prior art.
Figure 11A:
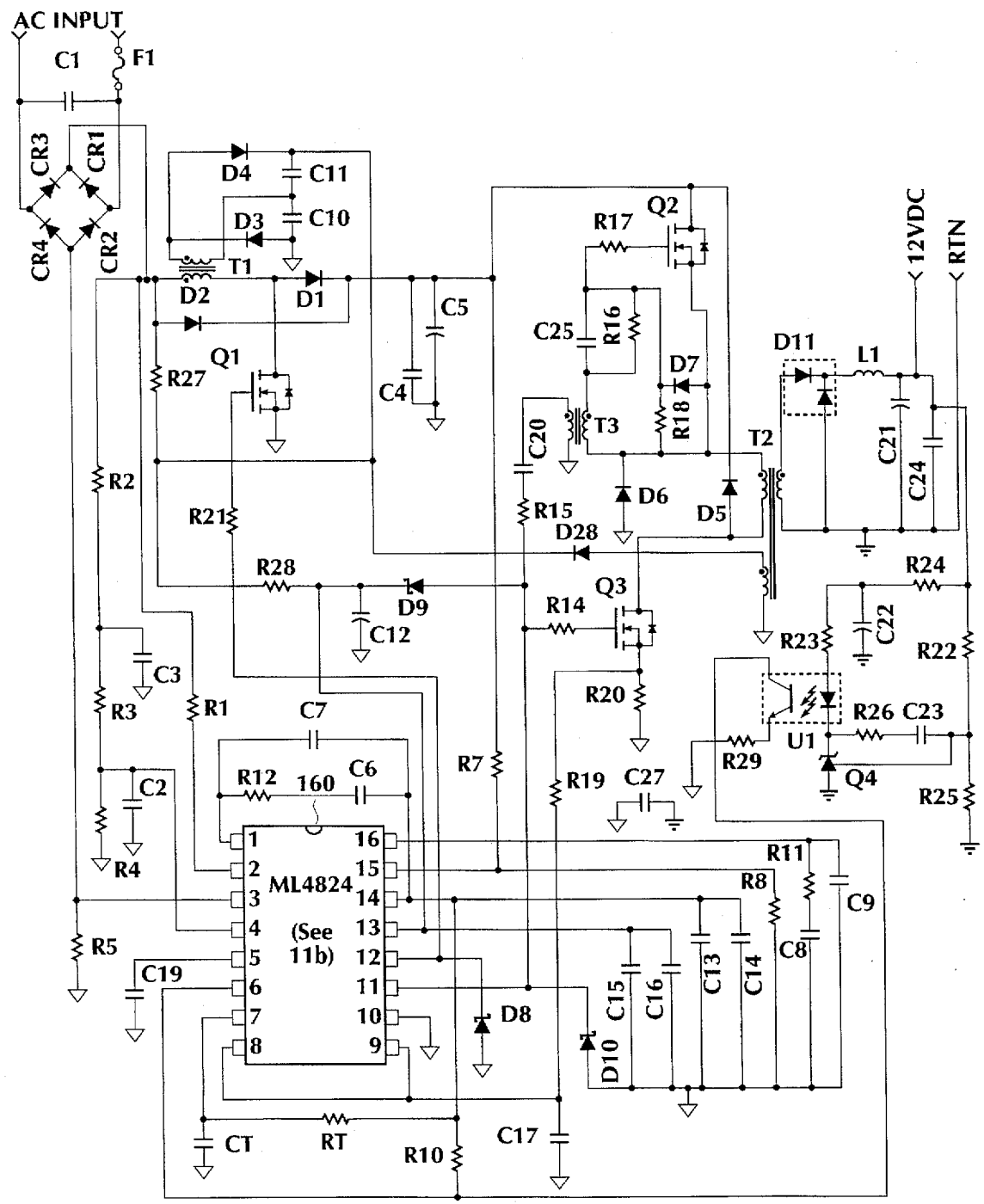
FIG. 11 illustrates a detailed schematic diagram of a power factor correction circuit and a pulse width modulation circuit of the prior art.
Figure 11B:
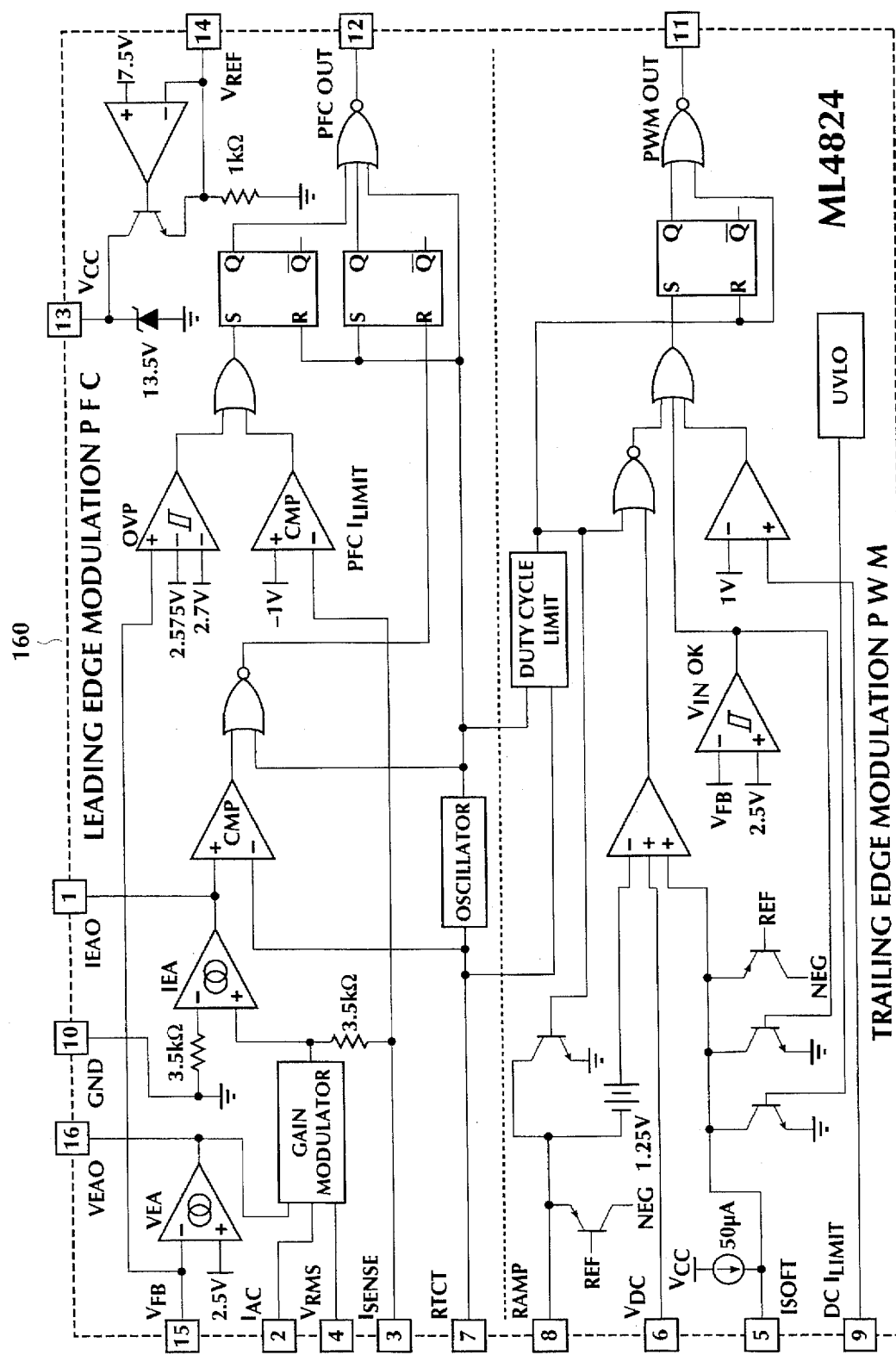

In column 12, line 45, delete "Fig. 15 illustrates timing diagrams for the circuits of Figs. 10 and 11.

In column 15, line 55 and 56, delete "OR gate US." and insert --OR gate U8.--.

UNITED STATES PATENT AND TRADEMARK OFFICE
CERTIFICATE OF CORRECTION

PATENT NO. : 5,742,151  Page 2 of 2

DATED : April 21, 1998

INVENTOR(S) :
Jeffrey Hwang

It is certified that error appears in the above-indentified patent and that said Letters Patent is hereby corrected as shown below:

In column 17, line 1, delete "Figs. 14 and 15 and illustrate" and insert --Fig. 14 illustrates--.

In column 17, line 2, delete "Figs. 12-15" and insert --Figs. 12-14--.

Signed and Sealed this

Eighteenth Day of August, 1998

Attest:

BRUCE LEHMAN

*Attesting Officer*  *Commissioner of Patents and Trademarks*